United States Patent
Chapman

(10) Patent No.: US 9,068,432 B2
(45) Date of Patent: Jun. 30, 2015

(54) AUTOMATED SURVEY ACCEPTANCE IN DYNAMIC PHASE MACHINE AUTOMATION SYSTEM

(75) Inventor: Clinton D. Chapman, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 308 days.

(21) Appl. No.: 13/529,922

(22) Filed: Jun. 21, 2012

(65) Prior Publication Data

US 2013/0228374 A1 Sep. 5, 2013

Related U.S. Application Data

(60) Provisional application No. 61/606,182, filed on Mar. 2, 2012.

(51) Int. Cl.
E21B 44/00 (2006.01)

(52) U.S. Cl.
CPC ..................... E21B 44/00 (2013.01)

(58) Field of Classification Search
CPC ........ E21B 44/00; E21B 44/005; E21B 47/12
USPC ........... 175/24; 166/53, 250.15; 700/275, 282
See application file for complete search history.

(56) References Cited

U.S. PATENT DOCUMENTS

| | | | |
|---|---|---|---|
| 4,354,233 A | 10/1982 | Zhukovsky et al. | |
| 5,623,680 A | 4/1997 | Flora-Holmquist et al. | |
| 6,233,524 B1 | 5/2001 | Harrell et al. | |
| 6,637,523 B2 | 10/2003 | Lee et al. | |
| 6,865,486 B2 | 3/2005 | Tobias et al. | |
| 6,868,920 B2 | 3/2005 | Hoteit et al. | |
| 6,892,812 B2 | 5/2005 | Niedermayr et al. | |
| 6,944,547 B2 | 9/2005 | Womer et al. | |
| 7,054,750 B2 | 5/2006 | Rodney et al. | |
| 7,650,241 B2 | 1/2010 | Jogi et al. | |
| 8,121,971 B2 | 2/2012 | Edwards et al. | |
| 8,474,550 B2 | 7/2013 | Byreddy et al. | |
| 8,527,248 B2 | 9/2013 | Thambynayagam et al. | |
| 8,746,459 B2 | 6/2014 | Scott et al. | |
| 8,775,145 B2 | 7/2014 | Downton | |
| 8,798,978 B2 | 8/2014 | Ertas et al. | |
| 2002/0120401 A1 | 8/2002 | Macdonald et al. | |
| 2004/0153245 A1 | 8/2004 | Womer et al. | |
| 2004/0216922 A1 | 11/2004 | Koivunen et al. | |
| 2007/0205022 A1 | 9/2007 | Treviranus et al. | |
| 2008/0314641 A1 | 12/2008 | McClard | |
| 2009/0132458 A1 | 5/2009 | Edwards et al. | |
| 2010/0133009 A1 | 6/2010 | Carlson et al. | |
| 2010/0250497 A1 | 9/2010 | Redlich et al. | |
| 2011/0077918 A1 | 3/2011 | Mutlu et al. | |

(Continued)

OTHER PUBLICATIONS

International Search Report and Written Opinion of PCT Application No. PCT/US2013/027761 dated May 30, 2013: pp. 1-14.

*Primary Examiner* — William P Neuder
(74) *Attorney, Agent, or Firm* — Rodney Van Warfford; Scott Stinebruner

(57) ABSTRACT

A method, apparatus, and program product facilitate the automation of an oil & gas process, e.g., a drilling process, through the use of a dynamic phase machine incorporating multiple autonomous agents. An agent may be used to perform automated acceptance of a survey performed by a downhole survey device, e.g., so that an oil & gas drilling process may proceed for an accepted survey.

20 Claims, 26 Drawing Sheets

(56) References Cited

U.S. PATENT DOCUMENTS

| | | |
|---|---|---|
| 2011/0162888 A1 | 7/2011 | McHugh et al. |
| 2011/0214920 A1 | 9/2011 | Vail, III et al. |
| 2013/0228328 A1* | 9/2013 | Chapman .................. 166/250.15 |
| 2013/0228374 A1* | 9/2013 | Chapman ........................ 175/24 |
| 2013/0231781 A1* | 9/2013 | Chapman ....................... 700/275 |
| 2013/0231787 A1* | 9/2013 | Chapman et al. .............. 700/282 |

\* cited by examiner

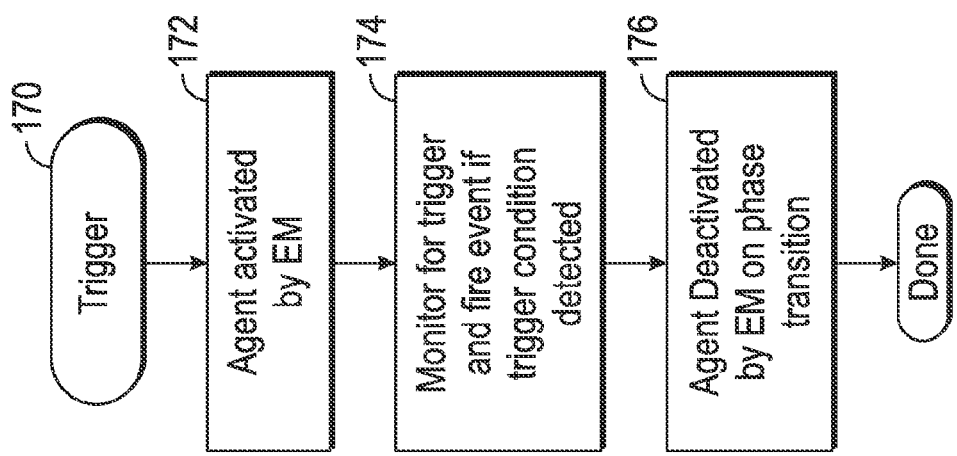
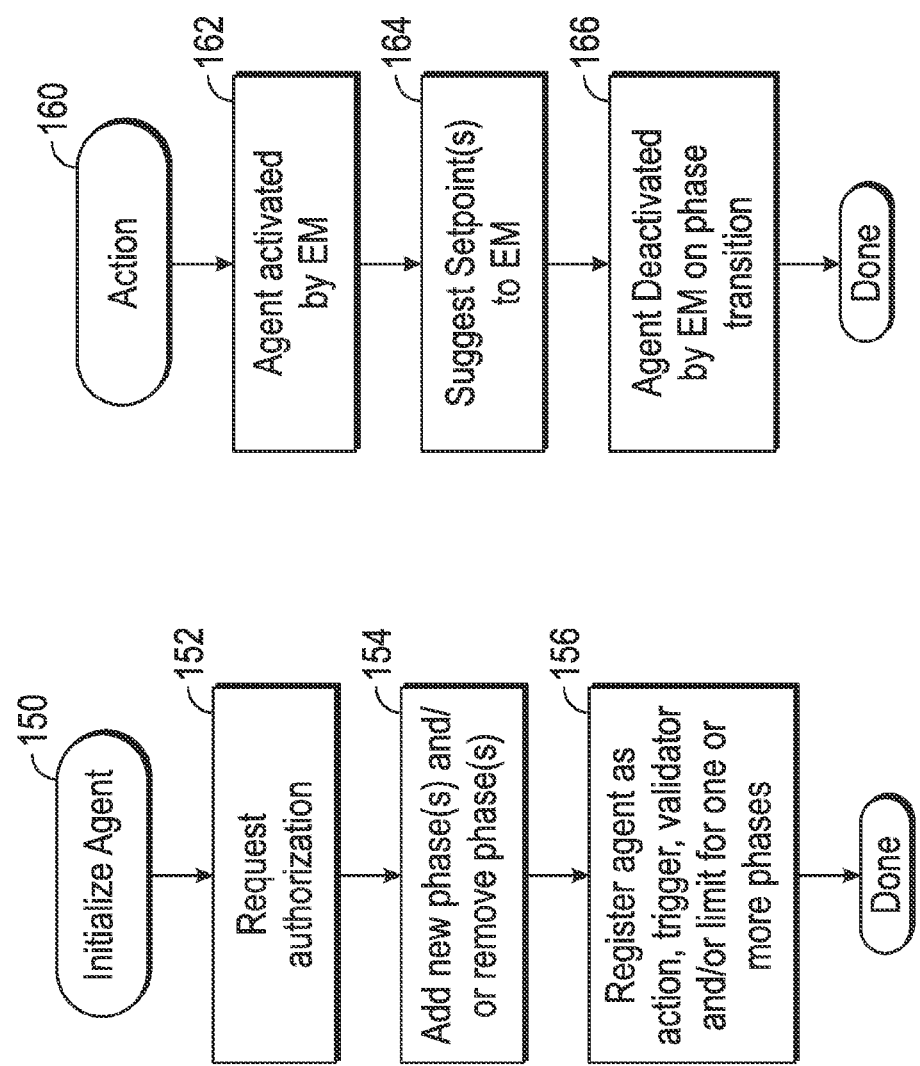

AUTOMATED SURVEY ACCEPTANCE IN DYNAMIC PHASE MACHINE AUTOMATION SYSTEM

CROSS-REFERENCE TO RELATED APPLICATIONS

This application claims priority on U.S. Provisional Application No. 61/606,182, filed on Mar. 2, 2012 by Chapman et al., which is incorporated by reference herein. In addition, this application is related to the following applications filed on even date herewith: U.S. patent application Ser. No. 13/529,733, entitled "DYNAMIC PHASE MACHINE AUTOMATION OF OIL & GAS PROCESSES," U.S. patent application Ser. No. 13/529,826, entitled "AGENT REGISTRATION IN DYNAMIC PHASE MACHINE AUTOMATION SYSTEM," and U.S. patent application Ser. No. 13/529,954, entitled "MASTER PLAN FOR DYNAMIC PHASE MACHINE AUTOMATION SYSTEM." The disclosures of these applications are also incorporated by reference herein.

BACKGROUND

Automating an industrial process is often difficult and complex, and often requires substantial efforts to optimize the process for a particular application. Industrial processes, in particular, often incorporate multiple equipment, machines and associated control systems, and often there is very little integration of these systems to facilitate the overall control of the process by a limited number of individuals or entities.

For example, in the oil & gas industry, drilling processes often require the interaction of and control over multiple control systems and equipment involved in drilling a well bore. A hoist system is used to support a drill string with a drill bit and multiple lengths of drill pipe, and a top drive system is used to rotate the drill pipe, and consequently, the drill bit. A mud circulation system driven by a mud pump circulates drilling fluid or mud down the well bore to lubricate and cool the drill bit and carry away drill cuttings, and in many instances, the drilling fluid drives a down hole bit motor to further rotate and/or steer the drill bit. An autodriller is often used to coordinate some of these operations; however, in conventional drilling rigs, much of the drilling process still involves a substantial amount of manual control and coordination of the individual systems and sub-systems in a drilling rig, often requiring the efforts of multiple personnel.

Furthermore, it has been found that due to variances between different applications, systems, sub-systems, equipment, sensors, machinery, and even variances in well bores and subsurface topology, no single algorithm is capable of managing or optimizing the entire drilling process for all possible applications.

Therefore, a substantial need continues to exist in the art for an improved manner of automating industrial and oil & gas processes, and in particular, drilling processes.

SUMMARY

The embodiments disclosed herein provide a method, apparatus, and program product that facilitate the automation of an oil & gas process, e.g., a drilling process, through the use of a dynamic phase machine incorporating multiple autonomous agents. An agent may be used in such a system to perform automated acceptance of a survey performed by a downhole survey device, e.g., so that an oil & gas drilling process may proceed for an accepted survey.

In one aspect, a survey performed by a downhole survey device in a drilling system during an oil & gas drilling process may be accepted by executing in a drilling automation system at least a portion of a dynamic phase machine that implements a control algorithm for the oil & gas drilling process and includes a plurality of phases. When the dynamic phase machine is in a first phase among the plurality of phases, at least one agent assigned to the first phase may be caused to compare survey data received from the downhole survey device against an acceptance criteria. The dynamic phase machine may then be selectively transitioned from the first phase to a second phase to proceed with the oil & gas drilling process based upon the comparison of the survey data against the acceptance criteria.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 6 is a flowchart illustrating an example sequence of operations for initializing an agent in the system of FIG. 1.

FIG. 7 is a flowchart illustrating an example sequence of operations for performing an action in an agent in the system of FIG. 1.

FIG. 8 is a flowchart illustrating an example sequence of operations for handling a trigger with an agent in the system of FIG. 1.

DETAILED DESCRIPTION

Figure 1:
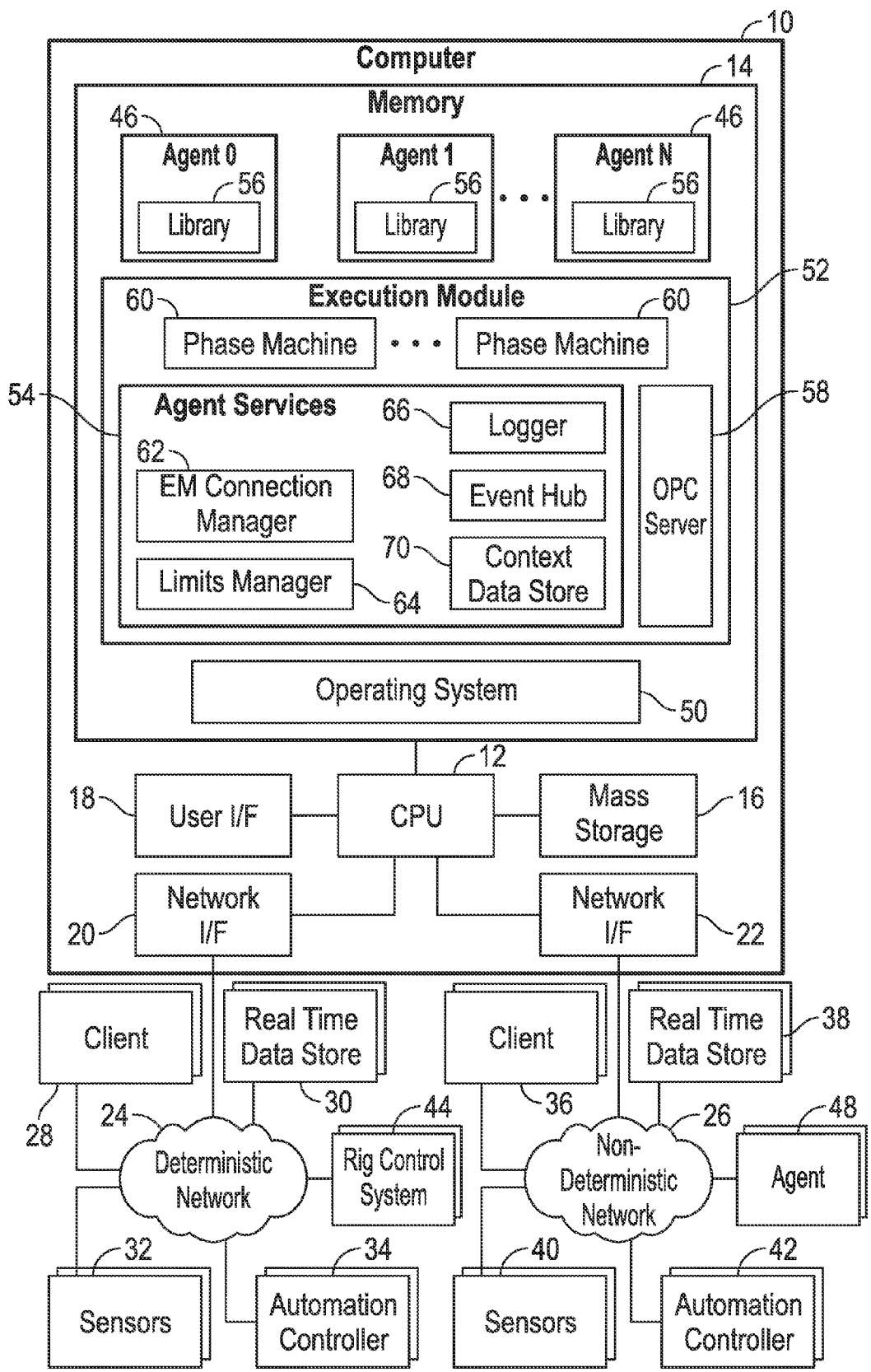
FIG. 1 is a block diagram of an example hardware and software environment suitable for hosting a dynamic phase machine automation system.

The herein-described embodiments invention provide a method, apparatus, and program product that facilitate the automation of an oil & gas process, e.g., a drilling process, through the use of a dynamic phase machine incorporating multiple autonomous agents.

As will become more apparent below, in one embodiment, a phase machine may be considered to be an implementation of a control algorithm in which activities are partitioned into multiple phases, and where one or more agents are registered to handle operations performed during phases and transitions between phases. A phase machine may be dynamic based upon an ability to be extended after deployment of at least a portion of the phase machine has been initiated, and in some embodiments after execution of the phase machine has started. Extension of a phase machine may include, for example, the addition, subtraction and/or modification of phases to effectively modify a control algorithm and underlying process implemented by the phase machine. Deployment of a phase machine may include creation of at least a portion of a phase machine in an automation system.

In one embodiment, an oil & gas process may be considered to be an industrial process related to the oil & gas industry and at least partially performing physical activities using one or more process components. In such an embodiment, process components may be considered to be controllable hardware and/or software entities that implement a physical oil & gas process, e.g., drilling rig equipment, machines and devices, and any hardware/software controllers therefore that are external to the automation system. Other processes associated with the oil & gas industry, including other processes associated with drilling, production or related activities, may also utilize the techniques described herein.

In addition, in one embodiment, an automation system may be considered to be a software and/or hardware environment that hosts one or more phase machines and provides an interface to permit agents, the phase machine or the automation system to receive data from external sensors and data acquisition hardware/software associated with a process, and to send commands or otherwise control process components to perform a process according to a control algorithm implemented by a phase machine.

An agent in one embodiment may be considered to be a software process that runs independently with some degree of autonomy, and that interacts with process components, controllers therefor and/or an intermediate service such as an automation system as described herein that provides access to the process components and/or the controllers therefor.

As will be discussed in greater detail below, agents may be assigned to phases, registered with an automation system and/or phase machine, and activated/deactivated, among other operations. In one embodiment, for example, agents may be assigned to one or more phases, and assignment in this regard may be considered to include tying an agent, or a function, procedure or method therein, to an action, trigger, validator or limit for a phase such that the agent handles that aspect when the phase machine is in the associated phase. Registration of an agent may be considered to include authorizing an agent to operate in an automation system and establishing an interface with the agent so that information can be exchanged between the agent and the automation system. Activation of an agent may include putting a registered agent in an active state so that it will handle its assigned duties and be responsive to messages or events generated by a phase machine, while deactivation may include discontinuing an active state of a registered agent from the perspective of the phase machine, e.g., in response to a transition to a phase for which the registered agent is not assigned any responsibilities.

As will become more apparent below, agents may be used to implement various aspects of various phases in a phase machine. As one example, an agent may implement an automated survey acceptance phase that controls the performance and collection of data from a downhole survey, compares the collected data against an acceptance criteria, and in appropriate circumstances, approves the survey and/or requests operator authorization to approve the survey so that a drilling operation may proceed. In addition, as will also become more apparent below, agents may be able to obtain data usable in performing an oil & gas process from a master plan that stores such data, e.g., tripping schedules and/or drilling parameters. In addition, in some embodiments, the master plan may be generated by a drilling simulator, or derived from a template generated by a drilling simulator. A master plan may also be capable of correlating data with time and/or spatial parameters, e.g., so that parameters returned to requesting agents or automation systems during a drilling operation may vary based upon the current time or depth of a drilling process.

In one embodiment, an oil & gas process performed by a plurality of process components may be automated by executing with at least one processor at least a portion of a dynamic phase machine, where the dynamic phase machine controls the plurality of process components to implement the oil & gas process and includes a plurality of phases, where the plurality of phases includes a first phase to which a first agent is assigned to handle a trigger for the first phase and a second phase to which a second agent is assigned to handle an action for the second phase, and where the trigger for the first phase defines a condition that when met causes a phase transition from the first phase to the second phase. In response to a determination from the first agent that the condition for the trigger is met when the dynamic phase machine is in the first phase, a transition may occur from the first phase to the second phase, and in response to transitioning from the first phase to the second phase, the second agent may be caused to perform the action for the second phase, including controlling at least one of the plurality of process components in response to the second agent.

In another embodiment, an oil & gas process performed by a plurality of process components may be automated by deploying a dynamic phase machine in an oil & gas automation system, where the dynamic phase machine includes a plurality of phases, and where a plurality of agents are registered with the oil & gas automation system and assigned to handle actions and triggers for at least a subset of the plurality of phases. After deploying the dynamic phase machine, the dynamic phase machine may be executed in the oil & gas automation system to control at least a portion of the plurality of process components and thereby implement the oil & gas process, and in response to registration of a new agent in the oil & gas automation system after deploying the dynamic phase machine, the oil & gas process implemented by the dynamic phase machine may be modified by dynamically extending the dynamic phase machine to include at least one new phase and assigning the new agent to handle at least one of an action and a trigger for at least one of the phases of the dynamic phase machine. After dynamically extending the dynamic phase machine, the dynamic phase machine may then be executed to control at least a portion of the plurality of process components and thereby implement the modified oil & gas process.

In yet another embodiment, a survey performed by a downhole survey device in a drilling system during an oil & gas drilling process may be accepted by executing in a drilling automation system at least a portion of a dynamic phase machine that implements a control algorithm for the oil & gas drilling process and includes a plurality of phases. When the dynamic phase machine is in a first phase among the plurality of phases, at least one agent assigned to the first phase may be caused to compare survey data received from the downhole survey device against an acceptance criteria. The dynamic phase machine may then be selectively transitioned from the first phase to a second phase to proceed with the oil & gas drilling process based upon the comparison of the survey data against the acceptance criteria.

In still another embodiment, an oil & gas drilling process performed by a plurality of process components may be automated by executing with at least one processor at least a portion of a dynamic phase machine, where the dynamic phase machine controls the plurality of process components to implement the oil & gas drilling process and includes a plurality of phases. In addition, data from a master plan associated with the oil & gas process may be retrieved during execution of the dynamic phase machine for use in implementing the oil & gas drilling process.

Other variations and modifications will be apparent to one of ordinary skill in the art.

Hardware and Software Environment

Turning now to the drawings, wherein like numbers denote like parts throughout the several views, FIG. 1 illustrates an example data processing system 10 in which a dynamic phase machine driven automation system may be implemented. System 10 is illustrated as including one or more computers, each including a central processing unit 12 including at least one hardware-based microprocessor coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a microprocessor, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices, e.g., a keyboard, a pointing device, a display, a printer, etc. Otherwise, user input may be received via another computer or terminal, e.g., over a network interface 20, 22 coupled to a network such as networks 24, 26. Computer 10 also may be in communication with one or more mass storage devices 16, which may be, for example, internal hard disk storage devices, external hard disk storage devices, storage area network devices, etc.

In this embodiment, computer 10 additionally serves as a secure bridge between a deterministic network 24 and a non-deterministic network 26. Deterministic network may have coupled thereto one or more clients 28, real time data stores 30, sensors 32 and automation controllers 34. Likewise, non-deterministic network may have coupled thereto one or more clients 36, real time data stores 38, sensors 40 and automation controllers 42. Clients 28, 36 in this regard may be considered to be clients of an automation system, while real time data stores 30, 38 may be considered to be any data store in which data related to a particular oil & gas process is collected and made accessible to the automation system. Sensors 32, 40 may be considered to include any sensors used to collect data related to a particular oil & gas process, while automation controllers 34, 42 may be considered to include any controllers utilized by an automation system when automating the operation of that system, e.g., for a drilling automation system, controllers such as a managed pressure drilling service, an autodriller service, downlink system, etc.

Deterministic network 24 may be implemented, for example, as a computer connected to a Profibus, and additionally may be coupled to one or more process components for which it is desirable to control in an oil & gas process, e.g., one or more drilling rig control systems 44, e.g., various PLC's and SCADA-connected hardware systems. Computer 10 serves as a secure bridge to this network from non-deterministic network 26, e.g., a TCP/IP network, and thus restricts access to deterministic network 24, and to the rig control, to only authorized entities and systems. In addition, in some embodiments, automation controllers 34, 42 may also be considered to function as process components for the purpose of controlling an oil & gas process. Further, in some embodiments another device coupled to a non-deterministic network may be used as a gateway between computer 10 and deterministic network 24.

As will become more apparent below, a dynamic phase machine driven automation system typically relies on one or more autonomous agents, which may be implemented either in computer 10, as in the case of agents 46, or externally, e.g., in a computer or other programmable electronic device coupled to computer 10 over non-deterministic network 26, as in the case of agents 48. Through the use, for example, of remote procedure calls and other distributed computing architectures, agents may be resident in various computers within a system and yet still participate in a dynamical phase machine driven automation system.

Computer 10 typically operates under the control of an operating system 50 and executes or otherwise relies upon various computer software applications, components, programs, objects, modules, data structures, etc., e.g., an automation server; also referred to herein as an execution module (EM) 52. EM 52 includes agent services 54, which may be accessed by agents, e.g., via client services supported by an agent library 56 implemented within each agent.

EM 52 may also include an OLE Process Control (OPC) server to support interoperability with process control systems, e.g., SCADA-based systems such as rig control systems 44, to provide real time data and control of such systems.

Agents 46, 48 are used, in a manner that will be discussed in greater detail below, to dynamically create and implement one or more phase machines 60. Each phase machine 60 effectively defines multiple phases and transitions between those phases, among other features, in order to implement an algorithm for a particular oil & gas process, such as drilling. As will become more apparent below, an innumerable number of combination of phases may be used to implement a phase machine capable of performing a desired oil & gas process in the automation system. Thus, the invention is not limited to the particular phase machines disclosed herein.

In addition, as noted above, each agent 46, 48 includes a library 56, e.g., an API, to support the interaction of an agent with EM 52. The library provides a consistent interface to the EM, thereby enabling agents to be deployed on computer 10 or in other computers, regardless of whether a portion of the EM is installed on the same computer. Moreover, libraries may be implemented for various operating systems, programming language, software platforms and/or hardware platforms, thereby enabling agents to be implemented in any suitable software and/or hardware environment and interact with the EM. For example, an agent may be resident on a laptop computer or a mobile device such that, when the computer or mobile device connects to a common network with the EM, the agent is automatically connected to the EM to dynamically change or otherwise extend a running phase machine to incorporate additional functionality provided by the agent.

In order to support dynamic phase machines and the agents that constitute the same, agent services 54 may include a number of software components, including, for example, a connection manager 62, a limits manager 64, a logger 66, an event hub 68 and a contextual data store 70. Connection manager 62 handles the connection and communication with agents 46, 48, while limits manager 64 stores phase-specific or global limits used to constrain operations performed by agents executing an action during a specific phase of a phase machine. Logger 66 creates, saves, and provides access to a log, while event hub 68 passes events to and from agents 46, 48 that have registered to handle such events. Context data store 70 is used to store contextual data that may be used to coordinate the activities of agents implementing a particular phase machine, e.g., a master plan, various drill rig data and parameters, parameters regarding drilling equipment such as a bore hole assembly (BHA), and other contextual data. Contextual data may be stored, for example, in XML files or in other formats, and may be editable via an external editor.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

It will be appreciated that agents, as well as the software components in computer 10 implementing an automation server may be distributed among multiple computers, e.g., within clusters or even within distributed systems where computers are geographically distant from one another. A distributed system furthermore may be implemented on heterogeneous computer systems such that agents resident on different hardware and/or software environments may interact with one another through a consistent and coherent protocol. It will also be appreciated that desirable security features may be implemented to ensure that only authorized agents are permitted to interact with other agents and underlying hardware in an automation system. Furthermore, it will be appreciated that an automation server or EM may be resident in a single, central computer, or may be distributed among multiple computers, e.g., as a distributed service, a cluster, a cloud service, etc.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the invention. Indeed, those skilled in the art will recognize that other alternative hardware and/or software environments may be used without departing from the scope of the invention. FIG. 1, in particular, is directed to an automation system suitable for use in a drilling operations, and as such, it will be appreciated that other process components, suitable for other oil & gas processes (e.g., tripping, dynamic pressure management, and reaming/wiping, production operations, production monitoring, pump servicing, wireline operations, well services, perforating operations, fracking operations, among others) may be utilized in lieu of the process components illustrated in FIG. 1.

Dynamic Phase Machine Automation System with Autonomous Agents

In the embodiments discussed hereinafter, autonomous computer software modules referred to herein as agents provide various functionalities that build themselves into a dynamic phase machine to construct a process that can address complex capabilities on the fly. As will become more apparent below, agents may be deployed dynamically and as the system is running to extend or otherwise modify the functionality of the system through modifications to the phase machine. It should be noted that the herein-described architectural also support implementations where dynamic deployment is completed prior to execution of the dynamic phase machine, and such that the dynamic phase machine is not dynamically extended after execution has been started.

Figure 2:
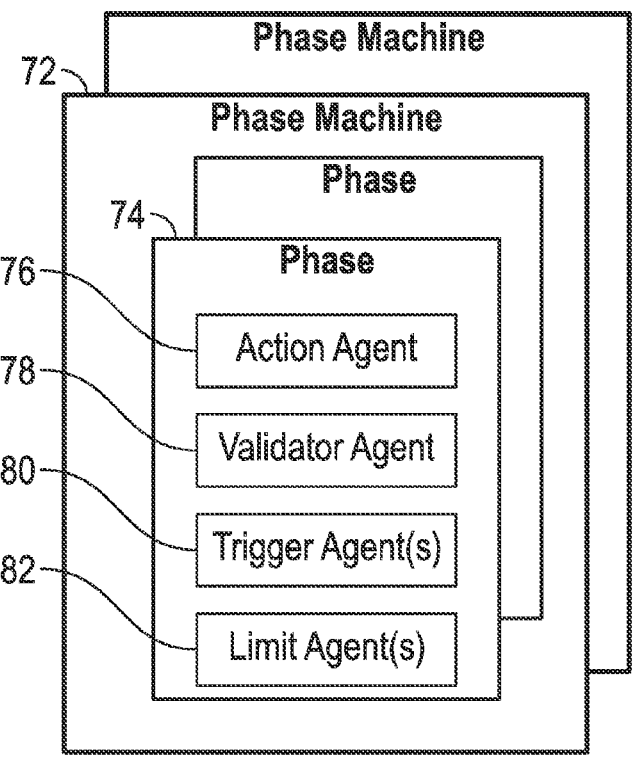
FIG. 2 is a block diagram of an example phase machine architecture used in the system of FIG. 1.

As the agents utilized in the illustrated embodiments are autonomous in nature, the EM or automation server functions as a middleware-type entity outside of the agents' "scope" to enable the agents to participate in oil & gas processes, such as drilling automation. As shown in FIG. 2, an EM or automation server operates as a central hub, which authorizes agents and maintains phase machines, e.g., phase machines 72.

Each phase machine 72 includes one or more phases 74, and each phase may have one or more actions, which represent the operations performed when a phase machine is transitioned into a particular phase. In the illustrated embodiment, a phase has a single action, but the invention is not so limited.

Triggers connect phases, and each phase may include one or more triggers to transition between phases. Phases may also include one or more validators, which determine whether a phase is or is not valid to enter. In the illustrated embodiment, a phase has a single validator, although the invention is not so limited. If a trigger fires, the action to change phase may not occur unless the target phase is also valid for entry (at that time), as determined by that phase's validator.

In addition, a phase may have associated with it one or more limits which constrain how actions are performed by the phase, e.g., minimum and/or maximum parameters that may be used with equipment being controlled by the automation system. As will become more apparent below, the limits may be static in nature or dynamic, such that limits may vary over time and based on different operating circumstances.

In the illustrated embodiments, the functions of the action, validator, trigger(s) and limit(s) for a particular phase are handled by one or more agents that are authorized to perform such functions. The agents "register" with the automation server/EM, and as such, each phase has associated therewith an action agent 76, validator agent 78, one or more trigger agents 80 and one or more limit agents 82.

Figure 3:
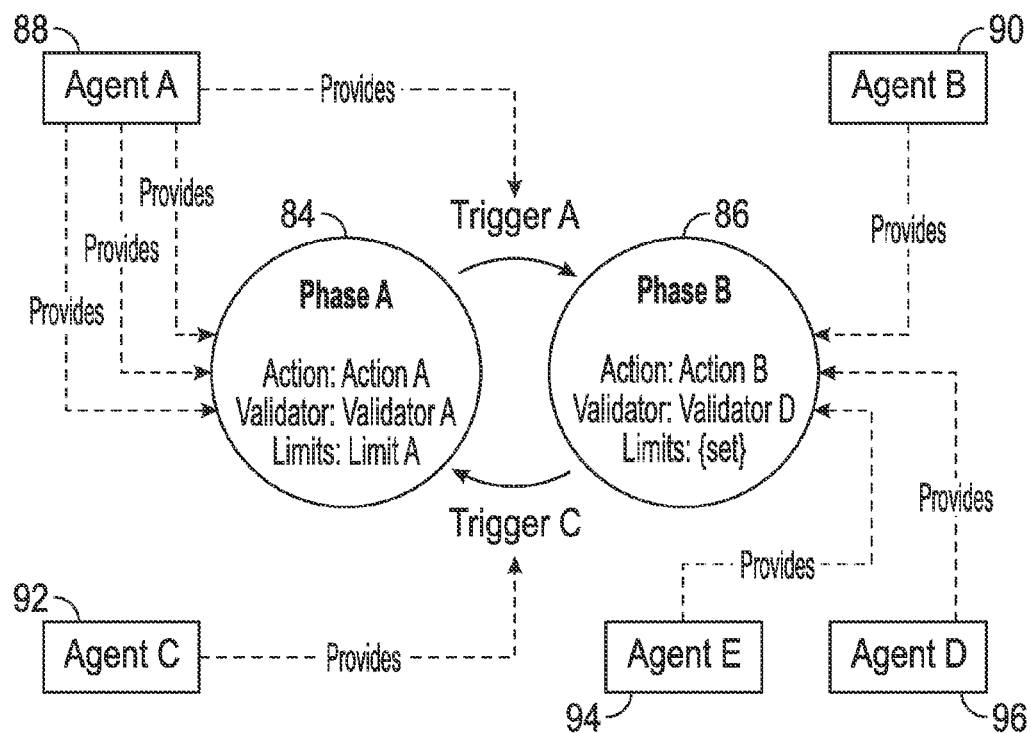
FIG. 3 is a block diagram of an example phase machine illustrating the registration of agents with phases in the system of FIG. 1.

Agents are not limited to handling only certain functionality for a phase, but may handle all functionality for a particular phase. In addition, an agent may handle certain functionality for multiple phases. FIG. 3, for example, illustrates a simplified phase machine incorporating two phases 84, 86, and designated as "phase A" and "phase B" respectively. For phase A, a single agent 88, designated as "agent A," is registered to provide the action, trigger, validator, and limit functionality for the phase. In contrast, for phase B, separate agents 90, 92, 94 and 96, designated respectively as "agent B", "agent C", "agent D" and "agent E," are registered to provide the action, trigger, validator, and limit functionality for the phase.

Figure 4:
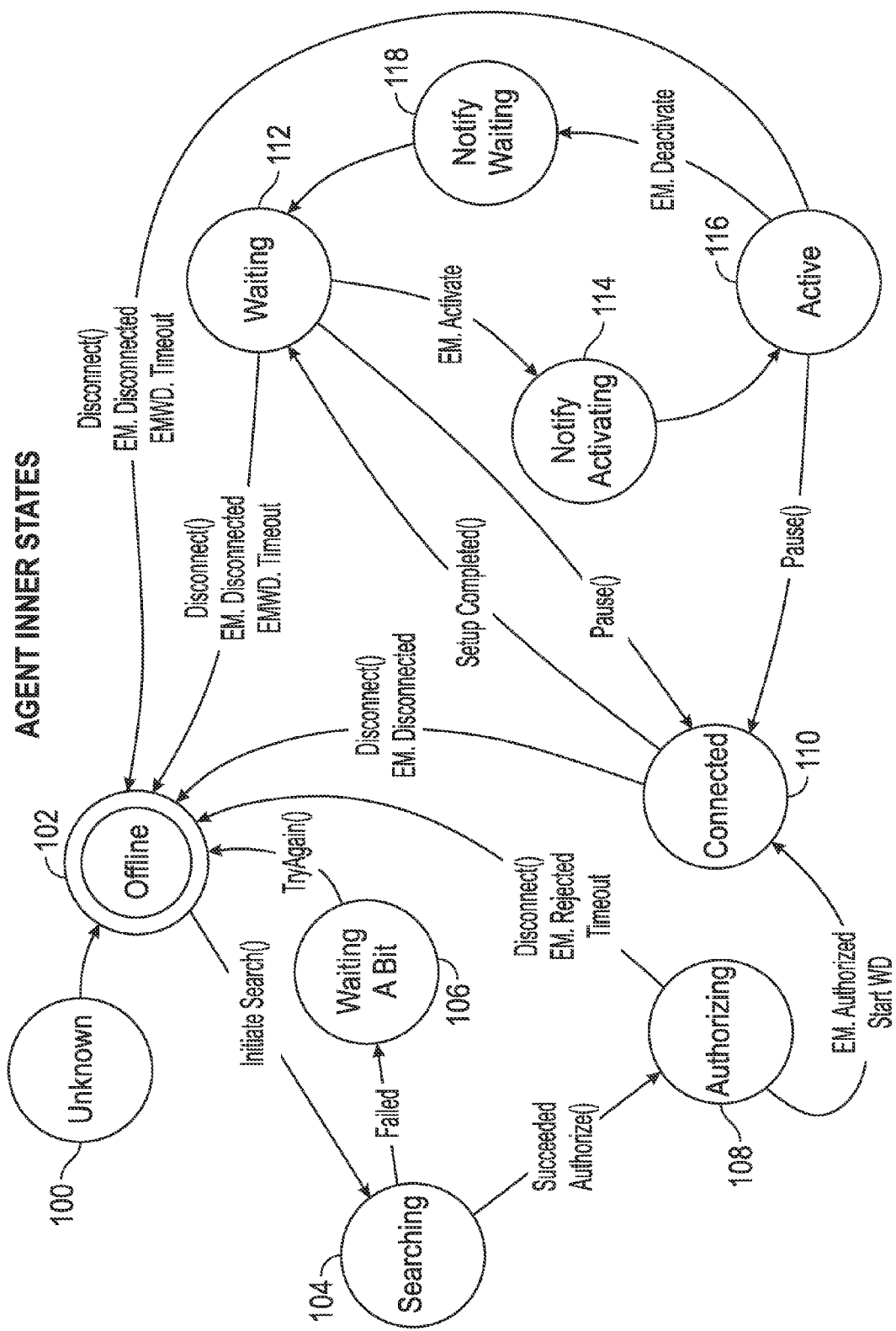
FIG. 4 is a state diagram illustrating the internal states of an autonomous agent in the system of FIG. 1.
Figure 5:
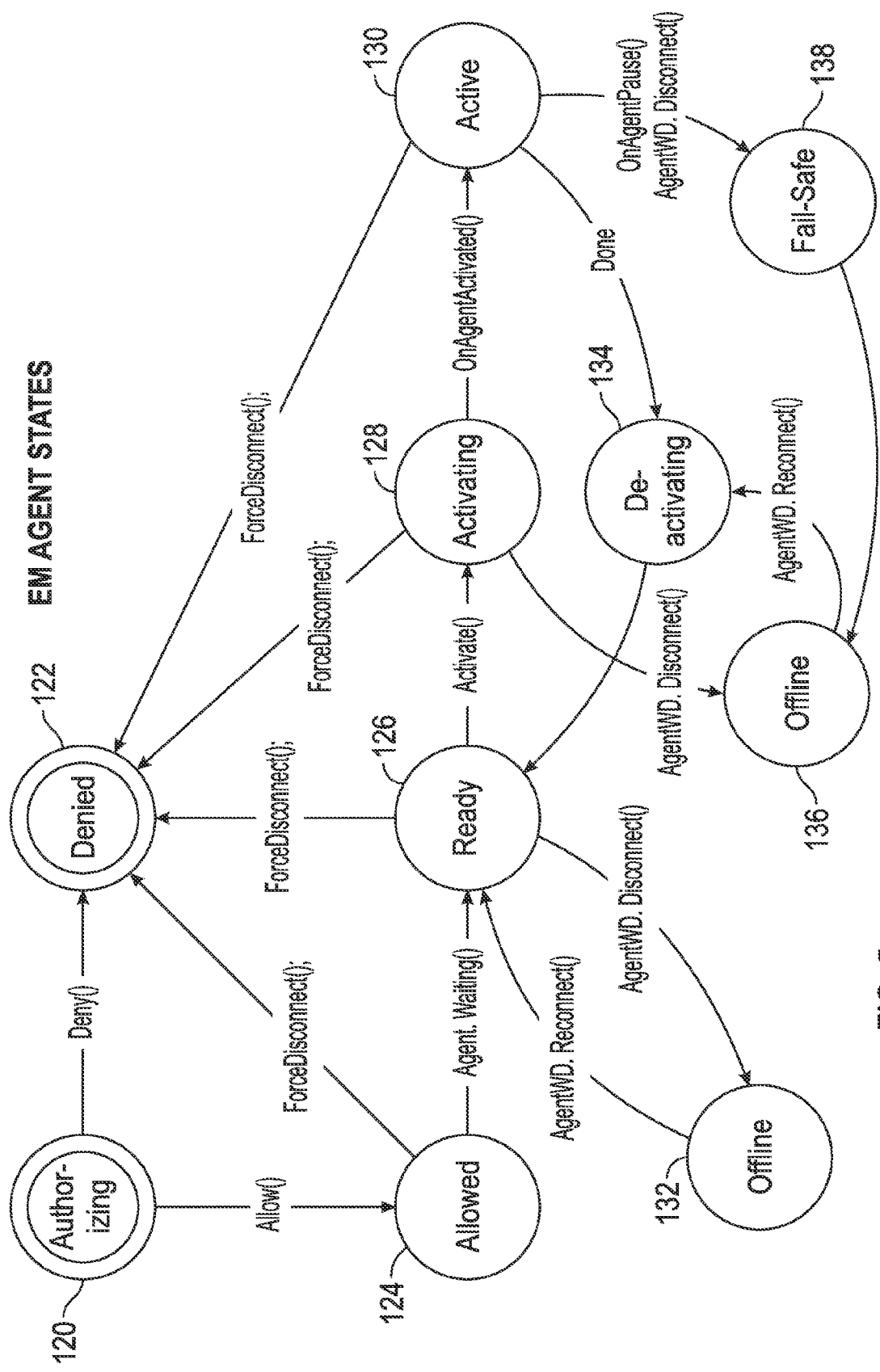
FIG. 5 is a state diagram illustrating the states of an execution module in the system of FIG. 1.

In order to be registered as an action, trigger, validator and/or limit for a phase, an agent is dynamically deployed or installed into the automation system. FIGS. 4-5, for example, respectively illustrate, from the perspective of an agent 46, 48 and EM 52, the interaction with an agent with the EM during registration, connection and activation in EM 52. EM connection manager 62 establishes and maintains connections to the EM by agents, and in these figures, in each state, an action can run. FIG. 4 is directed to the internal states maintained in an agent, while FIG. 5 is directed to the states assigned to an agent by an EM connection manager during the lifetime of an agent in the automation system.

From the perspective of an agent, as shown in FIG. 4, upon startup, the agent will transition from an unknown state 100 to an initial, offline state 102. At some point during initialization, the agent will then perform an InitiateSearch( ) action to initiate a search to transition to a searching state 104, during which the agent will search for an EM, e.g., using a service discovery methodology such as multicast UDP, a service registration service or library, or by employing a third party service discovery mechanism.

If no EM is found, a failure occurs and a transition is performed to a waiting a bit state 106, during which the agent waits a predetermined amount of time before performing a TryAgain( ) action to transition back to offline state 102 to initiate another search. Once the search is successful, however, search state 104 performs an Authorize( ) action to transition to an authorized state 108 and attempt to authorize with the EM. The authorization may encompass any number of security protocols to ensure that the agent is of an appropriate type and has suitable permissions to be installed in the automation server, e.g., based upon the rights of a user interacting with the EM, or based on a digital certificate.

If rejected by the EM (EM.Rejected) or if a timeout occurs, a Disconnect( ) action is performed and a transition occurs back to offline state 102. Otherwise, if the EM authorizes the agent (EM.Authorized), a StartWD (Start Watchdog) action is performed to transition to a connected state 110. At this point, it may be desirable to perform various setup operations for the agent, e.g., to register the agent to receive events, to add or remove phases, to register the agent as an action, trigger, validator and/or limit for one or more phases.

Once those operations are complete, a SetupComplete( ) action transitions to a waiting state 112 during which the agent waits to be activated by the EM. Activation, in this regard, may refer to an agent being activated for a particular phase with which it is registered, e.g., if an agent is registered as an action for a phase, the agent will be activated by the EM when a transition occurs to that phase. Similarly, for an agent registered as a validator, limit or trigger for a phase, the EM may activate the agent to perform the requisite validator, limit or trigger functionality for that phase. Thus, when a transition occurs to a different phase for which an agent is not registered, the EM may deactivate the agent.

In some instances, however, an agent may be activated for more extended periods of time, e.g., a limit agent may be activated and queried on demand by the EM whenever limits need to be determined.

At any point prior to activation, a transition may occur back to connected state 110, e.g., in response to a Pause( ) action, or a transition may occur back to the offline state 102 in response to a Disconnect( ) action, e.g., as a result of receiving an EM.Disconnected or EMWD.Timeout message from the EM. Otherwise, if an EM.Activate message is received from the EM, a transition occurs to a notify activating state 114, where the agent notifies the EM that it is activated, and then to an active state 116, at which point the agent is connected and active, and capable of receiving events from the EM event hub.

At some point thereafter, an agent may either be deactivated or disconnected. For example, receipt of an EM.Deactivate message may cause a transition to a notify waiting state 118, where the agent notifies the EM that it is going to the waiting state, and then back to waiting state 112, while receipt of an EM.Disconnected or EM.Timeout message from the EM will cause a Disconnect( ) action to transition back to offline state 102. In addition, an agent may be paused by a Pause( ) action and transition back to connected state 110.

Turning to FIG. 5, from the perspective of EM 52, and in particular EM connection manager 62, each agent in the system is maintained in a state from among those illustrated in FIG. 5. When an agent first attempts to authorize with the EM, the agent is in authorizing state 120, and if authorization is denied, a Deny( ) action transitions the agent to a denied state 122. Otherwise, if authorized, an Allow( ) action transitions to an allowed state 124. The EM then waits until an Agent.Waiting( ) message is received from the agent, which transitions the agent to a ready state 126. From there, the EM may perform an Activate( ) action to transition the agent to an activating state, and once the activating state is notified by the agent (state 114 of FIG. 4), an OnAgentActivated( ) action transitions the agent to an active state 130.

At any point in any of states 124, 126, 128 and 130, a ForceDisconnect( ) action may be performed to forcibly cause the agent to transition to denied state 122. In addition, as shown in ready state 126, an agent may be disconnected, causing a transition via an AgentWD.Disconnect( ) action to an offline state 132, after which a reconnection attempt may be made via an AgentWD.Reconnect( ) action to transition back to ready state 126. Similarly, within the activating and active states 128, 130, an agent may be disconnected, causing a transition via an AgentWD.Disconnect( ) action to an offline state 136, after which a reconnection attempt may be made via an AgentWD.Reconnect( ) action. In this case, however, the reconnection attempt transitions to a deactivating state 134, which then proceeds back to ready state 126 after notifying the agent to deactivate. State 134 is also transitioned to whenever the agent has completed a desired task (done) while in the active state 130. Furthermore, an AgentWD.Disconnect( ) action from active state 130 will transition to a fail-safe state 138 prior to transitioning to offline state 136. Pausing of an agent will also cause a similar transition from active state 130 to fail-safe state 138, e.g., in response to an OnAgentPause( ) action. It should be noted that pausing does not cause the system to go into a fail-safe state. An agent, however, may provide the EM with parameters or other instructions to control how the EM handles failure or loss of connectivity with an agent.

As such, as with the agent internal states in FIG. 4, from the perspective of the EM connection manager, an agent, once ready, can be selectively activated and deactivated as needed based upon the current phase of a phase machine. Thus, when a transition occurs from one phase to another, the agent(s) registered with the old phase may be deactivated, while the agent(s) registered with the new phase may be activated, thereby effectively allowing the automation system to handle the functionality required for the new phase.

The functionality for authorizing, connecting, activating and otherwise interacting with agents in the course of implementing a dynamic phase Machine may be implemented in a number of manners, e.g., using web services, databases, accessible storage media, or inter-process communications, although other platforms may be used in other embodiments. It will be appreciated that by supporting a common interface, agents deployed on different hardware and/or software environments may be permitted to interact with one another and with the EM. Moreover, it will be appreciated that the implementation of the aforementioned functionality would be well within the abilities of one of ordinary skill having the benefit of the instant disclosure.

Now turning to FIGS. 6-11, these figures illustrate the operations that may be performed by an agent resident in an automation system and registered with a phase machine. FIG. 6, for example, illustrates a sequence of operations 150 for initializing an agent. As noted above, in the illustrated embodiment, the initialization of agents is used to dynamically construct or build a phase machine. As such, when an agent is initialized, the agent requests authorization in block 152, e.g., as described above in connection with FIGS. 4-5, and once authorized, performs various initialization functions to prepare the agent for use in a phase machine. Among these functions are adding and/or removing one or more phases to and from a phase machine (block 154), and registering the agent as an action, trigger, validator and/or limit for one or more phases in the phase machine (block 156). Of note, an agent may be initialized dynamically and after a phase machine has been deployed and activated, and thereby dynamically modify the structure and operation of the phase machine during runtime.

FIG. 7 illustrates a sequence of operations 160 for an agent registered to handle an action for a phase in a phase machine. Once an agent has been initialized and is waiting in a ready state, the agent may, at some later point, be activated in connection with a transfer to a phase for which the agent is registered as an action, such that, upon activation, the agent performs its designated action until a phase transition occurs to a different phase, at which point the agent is deactivated. For example, the EM may activate the agent at block 162, and the agent may suggest one or more setpoints to the EM at block 164, e.g., to control one or more pieces of equipment coupled to the automation system. While in some embodiments, action agents may have direct control over equipment setpoints, in the embodiment discussed herein, the setpoints are merely suggested by the action agent such that other agents, e.g., limit agents, can prevent out-of-range setpoints from being used when they would violate one or more limits established in the system. An action agent in block 164 may additionally monitor various system parameters and dynamically adjust setpoints over time, until a transition occurs to a different phase, at which point the agent is deactivated by the EM (block 166). Limit agents may force a change to a setpoint if a limit changes over time due to dynamic monitoring of a system value or measurement, time and/or spatial context, a master plan or intervention from an operator or agent.

FIG. 8 illustrates a sequence of operations 170 for an agent registered to handle a trigger for a phase in a phase machine. Upon a transition to a phase for which an agent is registered as a trigger, the EM activates the agent (block 172), and the agent monitors for one or more trigger conditions defined by the agent, and fires an event if a trigger condition is detected (block 174). Then, upon a phase transition to a different phase (typically as a result of the trigger detected in block 174), the agent is deactivated by the EM (block 176).

Figure 9:
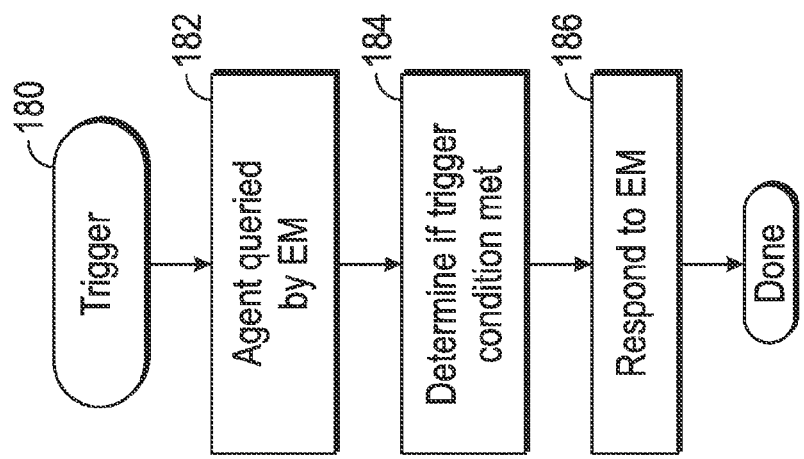
FIG. 9 is a flowchart illustrating an alternate sequence of operations for handling a trigger to that of FIG. 8.

In the embodiment of FIG. 8, trigger agents are activated only when a phase machine is in a phase for which they are registered. In an alternate embodiment, however, trigger agents may be activated at all times, and queried by the EM as necessary, such that the EM, rather than the trigger agents, fire the events that cause phase transitions. FIG. 9, for example, illustrates a sequence of operations 180 for a trigger agent in which a trigger agent, already activated, is queried by the EM to determine whether one or more trigger conditions has been met (block 182). Then trigger agent then makes the determination (block 184) and responds to the EM with the result of the determination (block 186). The EM, rather than the trigger agent, then triggers the transition to a different phase. It will be appreciated that since agents in this embodiment are still registered to specific phases, the EM may determine the appropriate trigger agents to query in any given situation based upon the current phase of a given phase machine.

Figure 10:
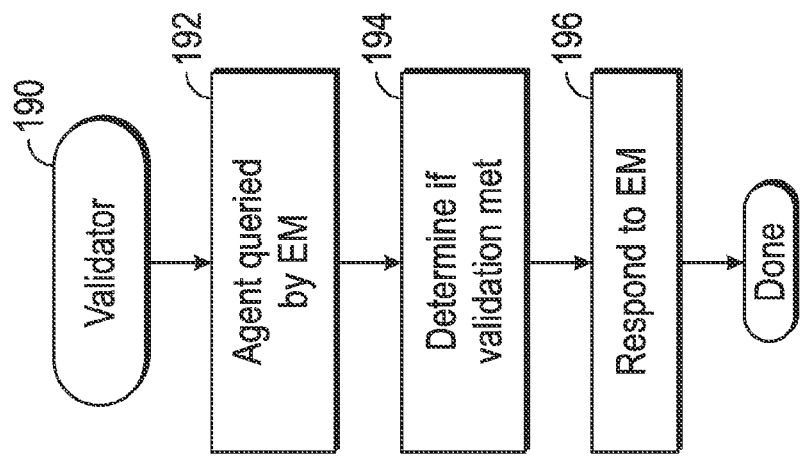
FIG. 10 is a flowchart illustrating an example sequence of operations for performing a validation with an agent in the system of FIG. 1.

FIG. 10 illustrates a sequence of operations 190 for an agent registered as a validator for a phase. A validator is used in the illustrated embodiment to control when phase transitions are permitted to certain phases in a phase machine. A validator may therefore be useful in prevent invalid or undesirable phase transitions from occurring in a phase machine, and thereby provide greater reliability and fault tolerance in a phase machine driven automation system. In this embodiment, validators operate in a similar manner to trigger agents in the embodiment of FIG. 9, i.e., validators are activated whenever the phase machine is running, and queried by the EM as needed, e.g., whenever a phase transition is attempted to a phase for which a validator is registered. Thus, as shown in FIG. 10, an agent is queried by the EM in block 192, the agent determines whether the phase transition is permitted (the validation is met) in block 194, and the agent responds to the EM with the result of the determination in block 196. In other embodiments, however, validators may be activated dynamically based upon the current phase of a phase machine, similar to action agents.

In the illustrated embodiment, when a validator determines that a phase transition may not occur, the EM transitions to an exception handling phase, e.g., to shut down the phase machine and the automated system until an operator can diagnose the issue. In other embodiments, a rejected phase transition may return control to the previous phase, e.g., so that exception handling functionality registered to the phase can handle the fault. Validators also allow the system to resume from a paused state, e.g., if an operator pauses auto-mation and performs some set of actions, the phase machine may provide a point of entry for all valid phases to the operator to resume the operations.

Figure 11:
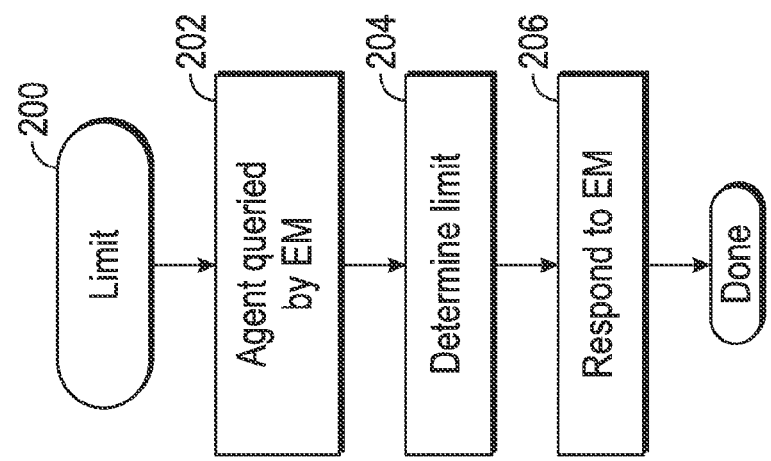
FIG. 11 is a flowchart illustrating an example sequence of operations for handling an limit in an agent in the system of FIG. 1.

FIG. 11 illustrates a sequence of operations 200 for an agent registered as a limit for a phase. A limit is used in the illustrated embodiment to constrain the operations of a phase machine in some manner. Limits may be statically defined, and thus effectively operate as constants, or may be dynamic in nature, and may be determined during runtime, e.g., based upon current operating conditions. Limits may be related to certain controllable or sensed variables for equipment being automated by an automation system, e.g., minimum and maximum positions for a hoist system. Alternatively, limits may be derived from certain controllable or sensed variables, e.g., to check against a torque limit when the setpoint is RPM. In the illustrated embodiment, however, it is the EM that actually performs the limit checking based upon limits returned by the limit agents. In other embodiments, however, limit agents may have greater autonomy such that the agents themselves may signal events whenever certain limits are being violated based upon current operating conditions.

In this embodiment, limit agents operate in a similar manner to trigger agents in the embodiment of FIG. 9, i.e., limit agents are activated whenever the phase machine is running, and queried by the EM as needed, e.g., whenever an action agent attempts to change a setpoint, or periodically while a phase machine is in a given phase. Thus, as shown in FIG. 11, an agent is queried by the EM in block 202, the agent determines the limit in block 204, and the agent responds to the EM with the determined limit in block 206. In other embodiments, however, limit agents may be activated dynamically based upon the current phase of a phase machine, similar to action agents. In addition, in other embodiments, limit agents may be queried by an EM once to determine particular limits, with those limits stored in the EM and accessible to the EM as the phase machine is running, thereby eliminating the need to query limit agents each time the EM compares system parameters against established limits.

Additional functionality may also be provided in an automation system incorporating dynamic phase machines with autonomous agents. For example, it may be desirable to include a console agent that provides a user interface for one or more operators to control and reconfigure a dynamic phase machine. Functionality for installing and uninstalling agents, setting system parameters and constraints, monitoring system function, etc., may also be provided. It will be appreciated that additional functionality may also be supported, so the invention is not limited to the particular architecture disclosed herein. Furthermore, implementation of such functionality in a dynamic phase machine driven automation system would be within the abilities of one of ordinary skill in the art having the benefit of the instant disclosure.

Dynamic Phase Machine For Drilling Automation System

Given the application-specific nature of a phase machine, the discussion hereinafter will focus on a specific application of a dynamic phase machine in controlling an oil & gas drilling operation, e.g., to perform a drilling operation for a single length of pipe or section in a drill stand, to provide a further illustration of the implementation and use of a dynamic phase machine incorporating autonomous agents. It will be appreciated, however, that dynamic phase machines may be utilized in connection with an innumerable number of other oil & gas-related processes, e.g., tripping pipe, so it will be appreciated the invention is not limited to drilling applications.

Figure 12:
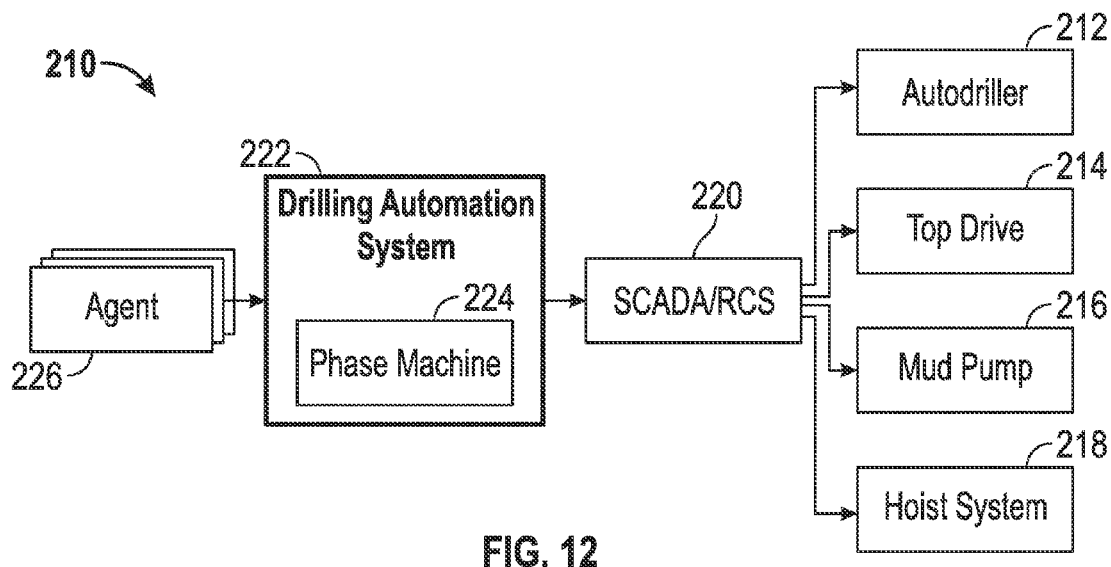
FIG. 12 is a block diagram of an example drilling automation system suitable for implementing a dynamic phase machine automation.

As illustrated in FIG. 12, a typical drilling system 210 may include an autodriller 212, top drive 214, mud pump 216 and hoist system 218 which cooperatively operate a drilling rig to rotate and drive a drill string with a bottom hole assembly (BHA) to achieve an optimum rate of penetration (ROP) for a drill bit on the BHA along a desired path or trajectory when drilling a well bore. Top drive 214 rotates a drill string comprised of the BHA and a plurality of interconnected drill pipes supported by hoist system 218, while mud pumps 216 circulates drilling fluid, or mud, in the well bore to prevent formation fluids from entering the well bore, lubricate and cool the drill bit, carry out drill cuttings and otherwise maintain well bore stability. In addition, in many applications the drilling fluid provides hydraulic power to the BHA to drive a bit motor that rotates, and often steers, the bit in a desired direction, as well as to power measurement while drilling (MWD) and logging while drilling (LWD) tools in the BHA and/or drill string. In addition, the drilling fluid may be used as a communications medium through which data is communicated between down hole tools and surface equipment, e.g., for the purposes of controlling drilling trajectory and receiving survey data. Autodriller 212 controls a number of drilling parameters, e.g., for top drive 214 and hoist system 218 to oversee the drilling process. It will be appreciated that additional control equipment and sensors, not illustrated in FIG. 12, may be found in a drilling rig, may contribute to the overall operation of the drilling process, and may be integrated into a drilling automation system incorporating a dynamic phase machine as described herein.

A drilling rig generally performs individual drilling operations segmented by the lengths of pipe that are sequentially added to a drill string as the drilling advances. Drill pipe is often stored in a drilling rig in stands of multiple joined drill pipes (e.g., two to five), and once a drilling operation proceeds to the point where the top pipe in the drill string drops into the well bore to a predetermined point, the drilling operation (the physical removal of material downhole) stops to enable another stand of drill pipes to be added to the drill string.

Control over a drilling operation relies on the interaction of autodriller 212, top drive 214, mud pump 216 and hoist system 218, and is dependent upon a number of sensed and/or derived variables, including, for example, for the top drive, throttle position, speed (e.g., in RPM), direction, position orientation, temperatures, electrical currents, hydraulic pressure, brake position, mud saver status, bail position, and torque (STOR); for the mud pump, standpipe pressure (SPP), differential pressures, gear setting, tank volumes, throttle settings, in and out flow rates, speed, and strokes/minute (SPM); and for the hoist system, hook load (HKLD), weight on bit (WOB), kelly down position, block position (BPOS), block velocity (BVEL), brake status, throttle settings, power settings. Additionally, other parameters may includes equipment temperatures, autodriller on/off status, autodriller mode, maximum WOB/differential pressure/torque/ROP of the autodriller. It will be appreciated that some systems such as the hoist system, the top drive, the mud pumps, etc. may be controllable by an intermediate automation or control system such as the autodriller, and that such systems may be controllable directly and/or via the intermediate system. A control network, e.g., a SCADA and/or rig control system (RCS) network 220, provides interconnectivity between these various control systems and a drilling automation system 222.

Automation is then provided in the manner described herein by one or more phase machines 224 implemented by one or more agents 226.

Figure 13A:
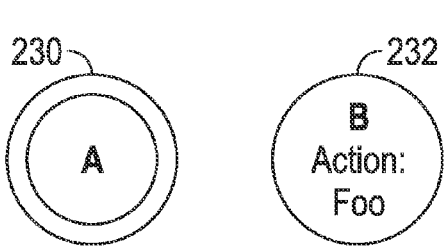
FIGS. 13A-13B are phase diagrams illustrating the registration of agents in an example phase machine in the system of FIG. 12.

As noted above, in a dynamic phase machines, phases are defined as including actions, triggers, validators and limits, and agents are authorized and registered to operate as actions, triggers, validators and/or limits for various phases in a phase machine. When an agent is authorized, the agent may also inject new phases into a phase machine and/or remove phases from the phase machine. For example, as shown in FIG. 13A, and for the purposes of simplifying the discussion below, if a phase machine has an initial phase A 230, when an agent, Foo, registers itself, it may add a new phase B 232, and ask for permission to be the Action 234 of phase B. Thus, if the phase machine is in phase B, the phase machine would perform the Foo Action.

Figure 13B:
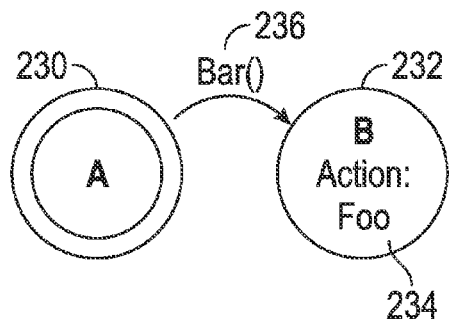

Subsequently, as shown in FIG. 13B, if another agent (Bar) has functionality to control when the phase machine should move from phase A to phase B, the Bar agent may register itself as a trigger 236. Thus, when the phase machine, which is managed by the EM, is in Phase A, it Activates Bar( ) and if it is Satisfied, it moves the system to Phase B. Then the EM may disable the triggers and actions of A, and then start B::Foo( ) and any triggers of B, which it does not currently have.

For drilling automation, the configuration in this embodiment may provide the following:

The phases may be defined independently of the phase machine:

Actions may be independent of the EM, i.e. the EM does not need to be aware of all potential phases, actions, validators, limits or triggers prior to deployment. The phase machine is dynamic as is the systems response, thereby allowing new functionality to be added post deployment, e.g., to allow the ability to add to or remove specific parts of a workflow post deployment. In addition, agents may be permitted to remove themselves. Furthermore, agents may be configured with varying levels of computational complexity, and furthermore, some agents, e.g., an agent that uses a very computationally intensive algorithm, may be permitted to run external to the EM and not affect other parts of the system.

Validation of phase entry allows for manual entry of phases, blocking of phases that are not appropriate to miss informed triggers, and for validators to be independent agents.

Agents may employ manual actions. For example, a trigger may be "OnOff" when the drilling automation system turns off) go to an offline phase.

Triggers may be constructed to apply to any phases matching some criteria. For example, a system alarm may apply to multiple phases of the system so that it would trigger a change from one phase to a phase that could handle the alarm.

Agents may be enabled or disabled as needed by the EM.

FIGS. 14A-14I illustrate by way of example the dynamic construction of a multi-phase phase machine for automating a drilling process, referred to as "Drill-A-Stand," representing an operation to drill forward the length of a stand of drill pipes. Beginning in FIG. 14A, a Drill-A-Stand phase machine may be initialized with a single, offline state 250. Deployment of a first agent (ROPO) may result in the creation of a Drill-Ahead state 252, for which the ROPO agent is registered as the action for the Drill-Ahead state, such that the ROPO agent runs whenever the phase is Drill-Ahead.

Figure 14A:
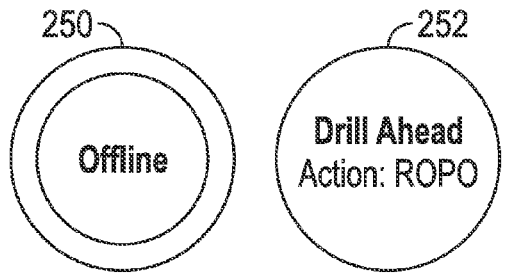
FIGS. 14A-I are phase diagrams illustrating the dynamic building of a phase machine in the system of FIG. 12.
Figure 14B:
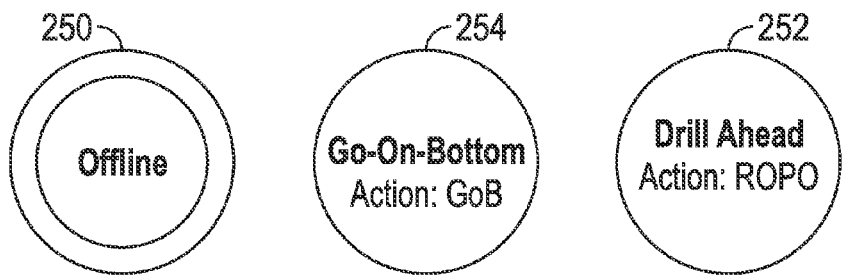
Figure 14C:
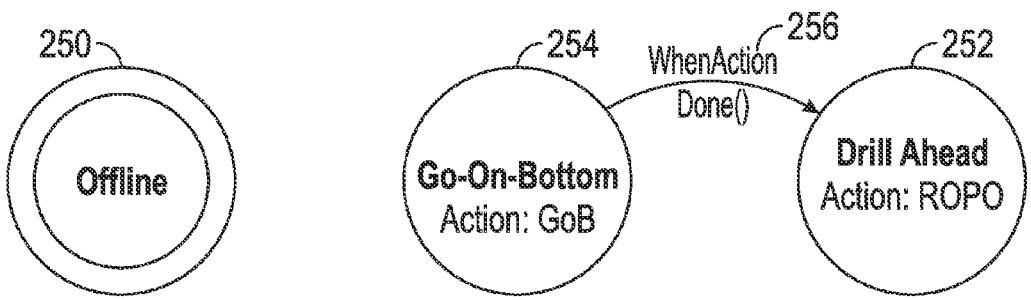
Figure 14D:
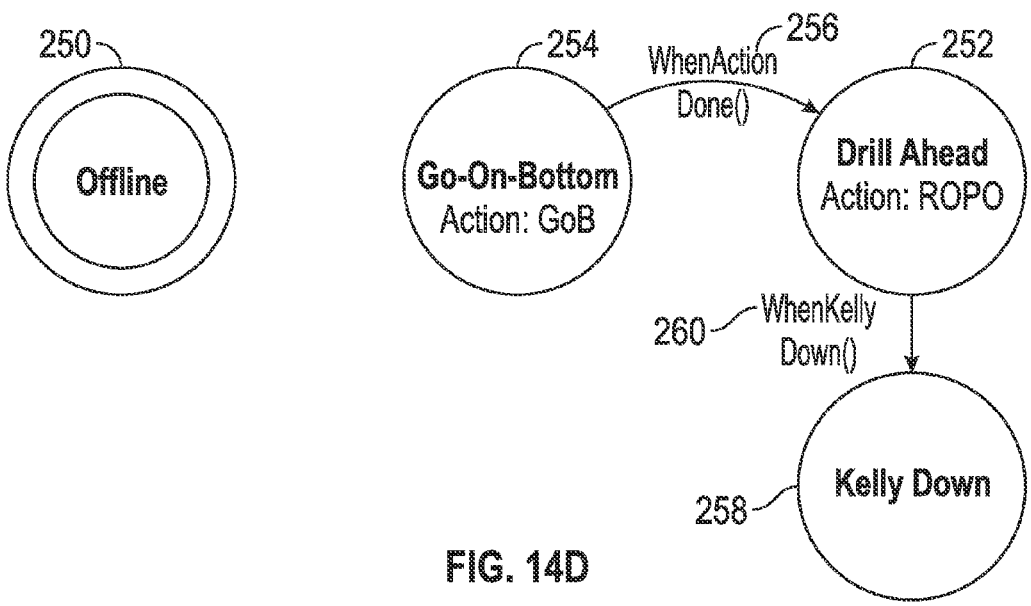
Figure 14E:
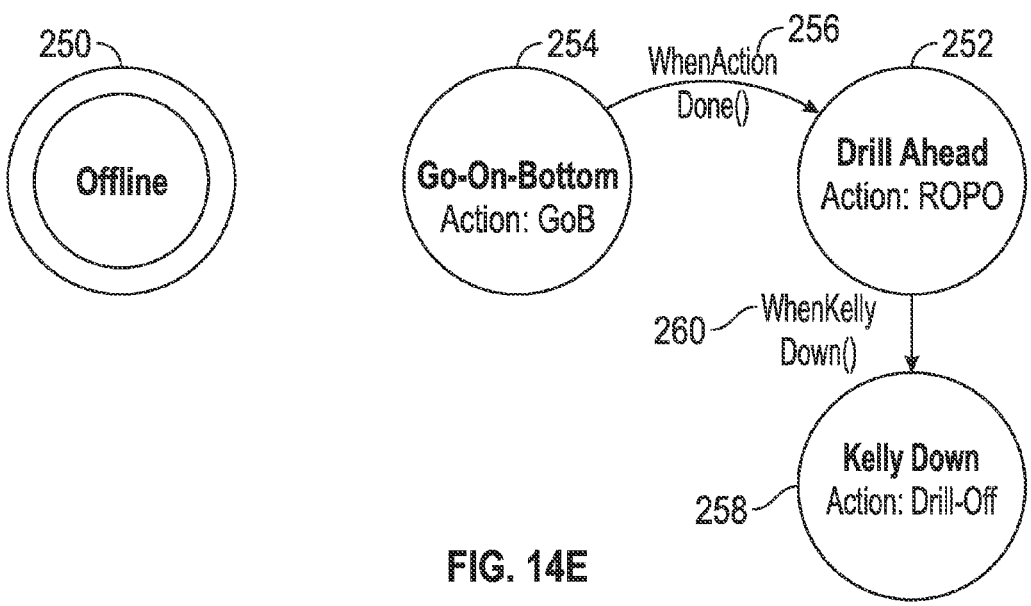

Then, as illustrated in FIG. 14B, another agent (GoB) may add a Go-On-Bottom phase 254 and register itself as the action for that phase. Thereafter, as illustrated in FIG. 14C, a generic agent, When ActionDone, may be registered as a trigger 256 for the Go-On-Bottom phase so that when the action says it is complete a transition will occur from the Go-On-Bottom phase to the Drill Ahead phase. Next, as illustrated in FIG. 14D, a Drill-Off agent that monitors block height to determine when the phase is finished may add a KellyDown phase 258, and register itself as a trigger 260, When KellyDown( ), for Drill-Ahead phase 252. Then, as illustrated in FIG. 14E, the Drill-Off agent may register itself as the action of KellyDown phase 258.

Figure 14F:
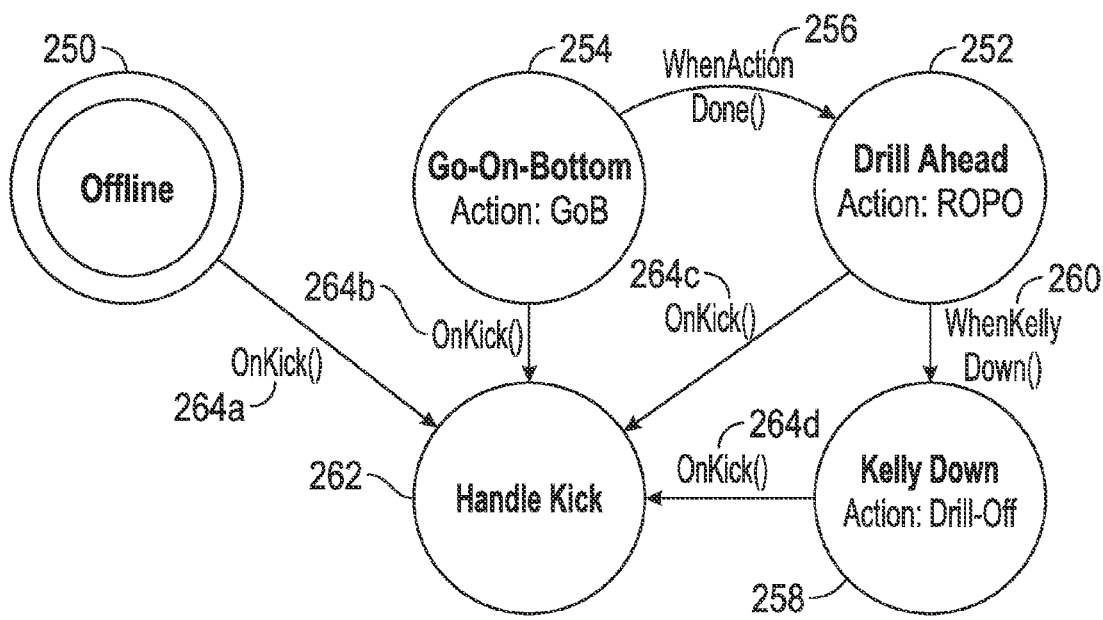

Thereafter, as illustrated in FIG. 14F, a new agent is deployed to handle kicks, i.e., unplanned flows of formation fluids into a well bore, resulting in the addition of a Handle-Kick phase 262. Since kick handling may be useful for all phases, the agent may register triggers 264a-d with each of phases 250, 252, 254 and 258. Thus, the dynamic phase machine, as configured in FIG. 14F, illustrates the handling of alarms outside of the normal flow of operations, as well as the provision of multiple triggers for a single phase. Additionally, in some embodiments, a trigger may be generically applied to phases that may or may not exist when the trigger added itself to the system.

The phase machine of FIG. 14F, however, is limited in several respects. First, at this point there is no agent that has been registered to handle the action for the HandleKick phase, so in the event that a kick does occur, there is no automated functionality for handling the kick. Second, no trigger has been established to move from the Offline phase to the Go-On-Bottom phase. Third, there is no transition out of the HandleKick phase.

Nonetheless, in the illustrated embodiment, the EM is configured to switch over from automatic to manual control whenever any of the aforementioned actions occur, which is beneficial from the standpoint that it is evident from the phase machine diagram when the drilling automation system requires manual control. Thus, in these instances, when an operator needed to change phases when manual control was invoked, the operator could be presented with a user interface to enable the operator to select a valid phase (e.g., with three controls or buttons corresponding to "Offline," "Go-On-Bottom," and "HandleKick").

It should be noted, however, that not all phases may be available for manual transition at a particular time because not all phases will be valid at any particular moment, e.g. Kelly Down (Drill-Off) may not be applicable because the system is not on bottom. Validator agents provide this function. Thus, a manual action to move from Handle Kick to Drill-Ahead may be possible, but only if Drill-Ahead is in a valid phase. It may be that the rig has to start rotation and flow again (after a kick) before Drill-Ahead becomes a valid phase to start in.

Figure 14G:
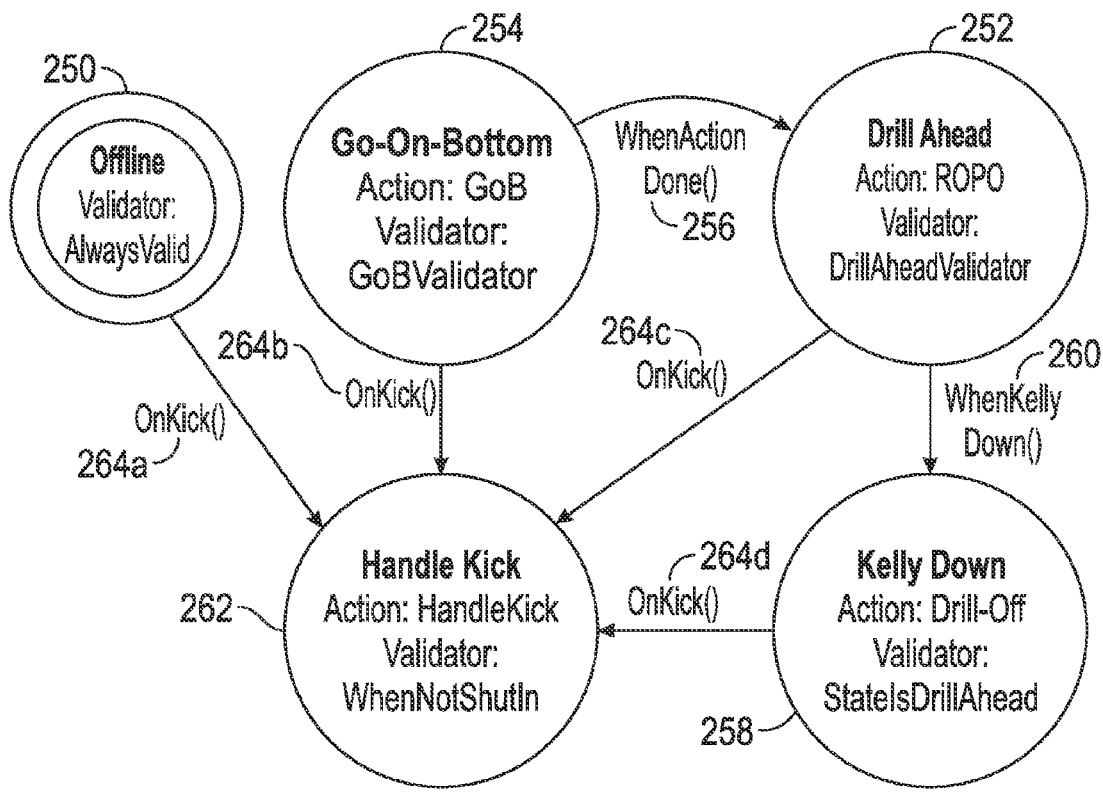

FIG. 14G, for example, illustrates the addition of Validators agents to each phase. These can be generic validators, e.g., an "AlwaysValid" validator for the Offline phase, or may be provided by specific agents (e.g., GoBValidator, DrillAheadValidator, StateIsDrillAhead, and When NotShutIn).

Figure 14H:
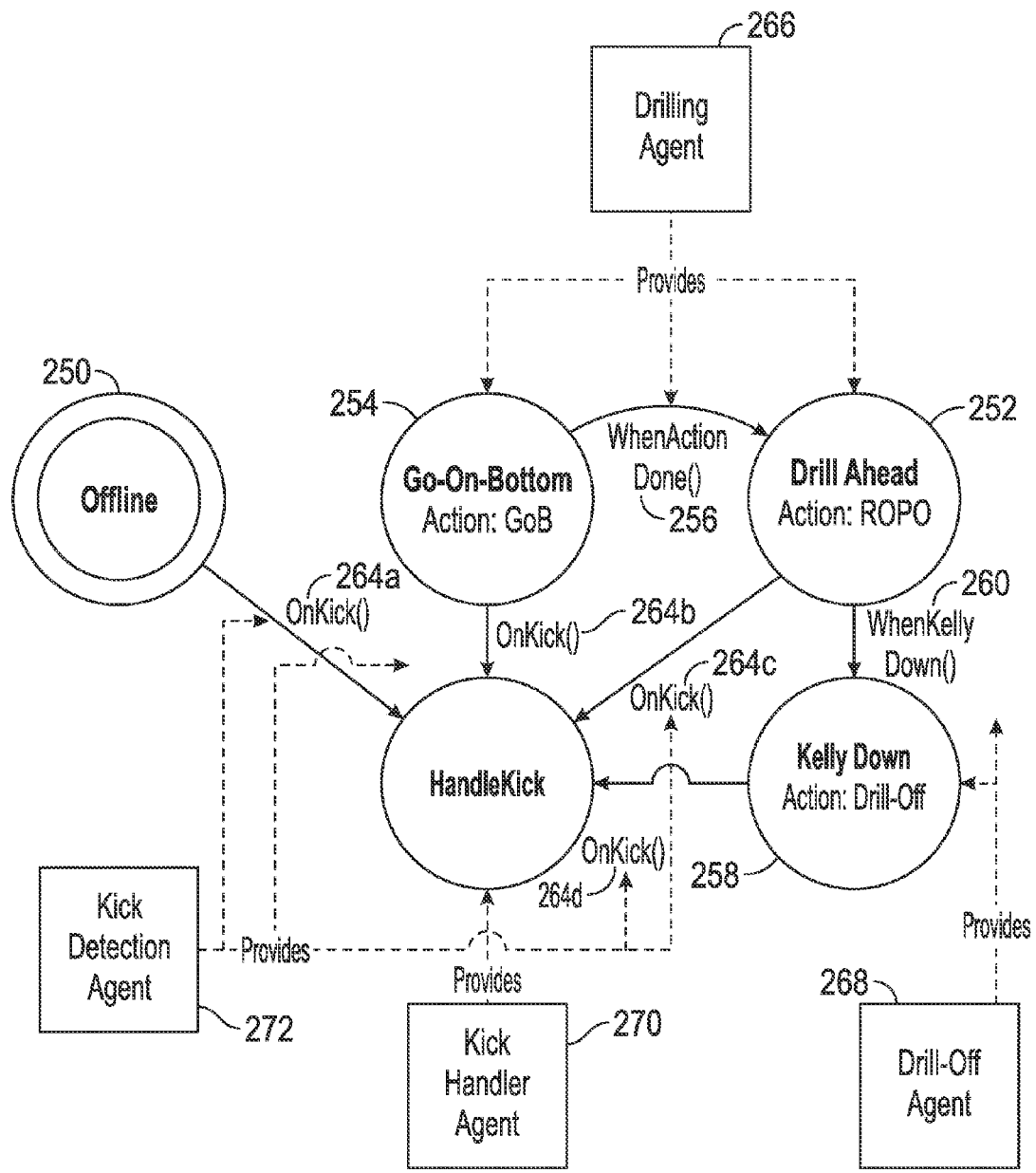

FIG. 14H illustrates the phase machine constructed in FIG. 14G along with agents (e.g., Drilling agent 266, Drill-Off agent 268, Kick Handler agent 270 and Kick Detection agent 272) that may provide the functionality for the various phases in the phase machine. Note that certain agents identified separately above in FIGS. 14A-14G are illustrated as having been combined into the four agents illustrated in FIG. 14H. It will be appreciated that in the illustrated embodiment, the agents may execute on the same or different computers, and register themselves with the EM and communicate via the interface provided by the EM and described in greater detail above.

Figure 14I:
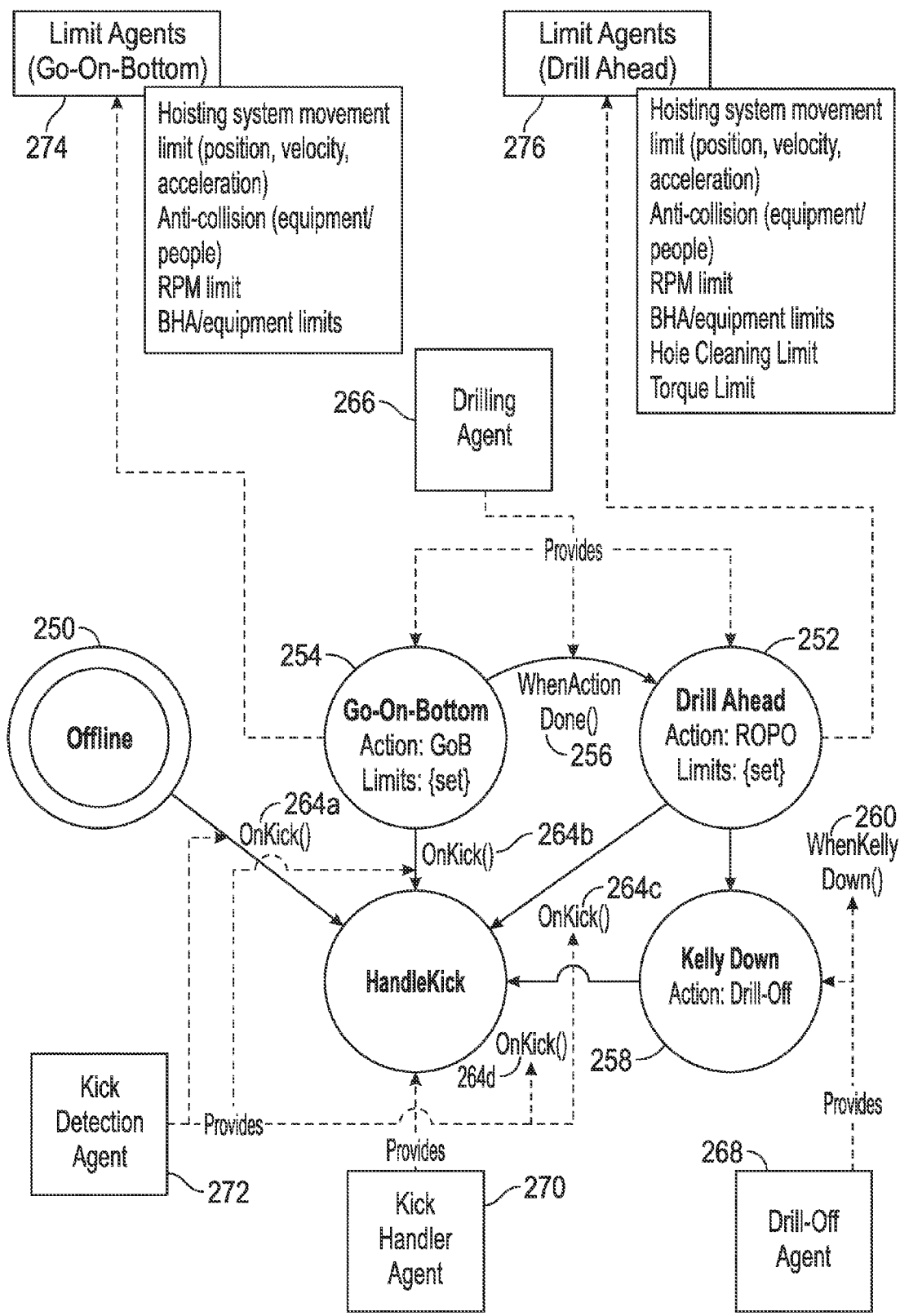

FIG. 14I next illustrates the addition of limit agents 274, 276, which respectively add limit functionality for the Go-On-Bottom and Drill Ahead phases. In some embodiments, limit agents, as discussed above, register to specific or generic phases in a similar manner to actions, triggers and validators, so that when a phase is activated, the limits agents may be queried to determine the current limits on equipment, which can be set points. The limits may also be higher level limits, such as torque on the top drive, which the action agents may use to dynamically modify their behavior. For a Go-On-Bottom phase, for example, relevant limits may be related to hoisting system limits (position, velocity, acceleration, etc.), anti-collision limits (for people and/or equipment), RPM limits, BHA/equipment limits, etc. For a Drill Ahead phase, relevant limits may be related to the same limits applicable to Go-On-Bottom, as well as additional limits such as hole cleaning limits, torque limits, etc.

In some embodiments, from a usage perspective, limit agents may be permitted to be switched: off by an operator of the system to allow all or agents to change their behavior or to go beyond the suggested limits. In addition, in some embodiments, limit agents may possess common capabilities, such as logging, enforcement, and registration capabilities, e.g., logging when a limit is exceeded or overridden, preventing set points from being outside of a max/min range of acceptable values, or registering a type of limit, e.g. an RPM limit or a BPOS limit.

Figure 15:
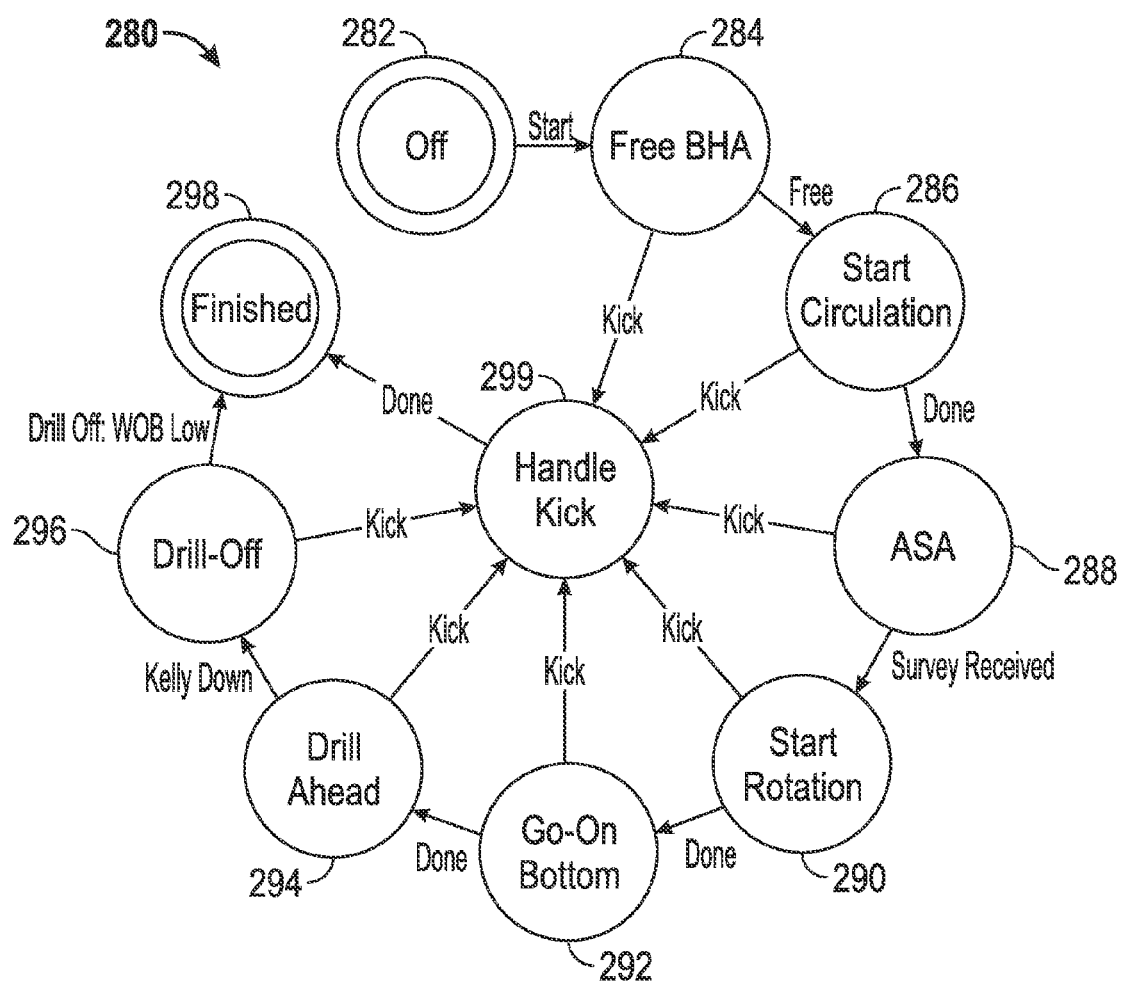
FIG. 15 is a phase diagram of an example drilling phase machine for use in performing a drilling process in the system of FIG. 12.

Next, to illustrate additional details regarding the various types of agents and phases that may be implemented within an automated drilling system, FIG. 15 illustrates an exemplary phase machine 280 including phases 282-299. Phase machine 280 begins in an Off phase 282, and upon detection of a start trigger, transitions to a Free BHA phase 284, during which the drill string is lifted to confirm that the BHA is free (i.e., not stuck) prior to commencing a drilling operation. Assuming that the BHA is confirmed to be free, a transition occurs to a Start Circulation phase 286, where the mud pump is started to circulate drilling fluid in the well bore. When circulation is started, a transition then occurs to an Automatic Survey Acceptance (ASA) phase 288 to accept a down hole survey conducted by the BHA. It will be appreciated that once circulation is established in the well bore, an electrical generator on the BHA will power-up electronics in the BHA and initiate a survey that attempts to determine the orientation of the BHA, e.g., via determining azimuth and inclination, thereby enabling a determination to be made as to whether the drilling operation is proceeding along the intended path. This information is communicated uphole to either verify the drilling path or applying any necessary corrections. In some instances, however, the survey may not be properly communicated uphole, so the ASA phase attempts to confirm acceptance of the survey prior to enabling a transition to another phase.

When a survey is received, a transition therefore occurs to, a Start Rotation phase 290, where rotation of the drill string is initiated, and thereafter to a Go-On-Bottom phase 292 where the drill string is dropped until the drill bit tags the bottom of the well bore. A transition then occurs to a Drill-Ahead phase 294, which drops the rotating drill string at an appropriate rate to initiate drilling of the well bore. Drilling then proceeds until a predetermined point, e.g., at "Kelly Down," or at a specific bit/hole depth, at which point a transition occurs to a Drill-Off phase 296. In this phase, drilling is halted to ready the system for another phase, e.g., reaming, wiping, tripping out pipe, or preparing to add another stand to the drill string for another Drill-A-Stand operation. When the Drill-Off operation is complete, e.g., when a low weight on bit (WOB) is achieved after rotation and circulation have been halted and the drill string lifted to an appropriate position. A transition then occurs to a Finished phase 298, at which manual control is returned.

In addition, a Handle Kick phase 299 is provided, along with accompanying triggers in each of phases 282-296, to handle any kicks. When a kick is handled, a transition then occurs to the Finished phase 298 where manual control is returned to an operator.

Further details regarding several of the phases illustrated in FIG. 15, as well as agents that may be used to provide functionality for such phases, are provided below.

Free BHA

The Free BHA phase is initiated prior to drilling to ensure that the BHA is, not stuck in the well bore. Freeing the BHA from possible sticking or hang-ups along the well trajectory is required in some cases to ensure that the BHA is not damaged when rotation begins. One method for determining if the BHA is free is to lift the BHA while monitoring for overpull. Automating the movement up and the listening for overpull in a real-time system can assist in preventing the pipe from being parted (ripped apart) as the BHA is lifted. As the BHA is lifted, real-time data may be analyzed by examining the hook load (HKLD) to see when the BHA has transitioned from static (non-moving) friction to fully dynamic friction, i.e., HKLD is substantially steady as the BHA is lifted. Additionally, a Free BHA system, using torque and drag analysis, may determine an optimal distance to ensure the BHA is free.

Figure 16:
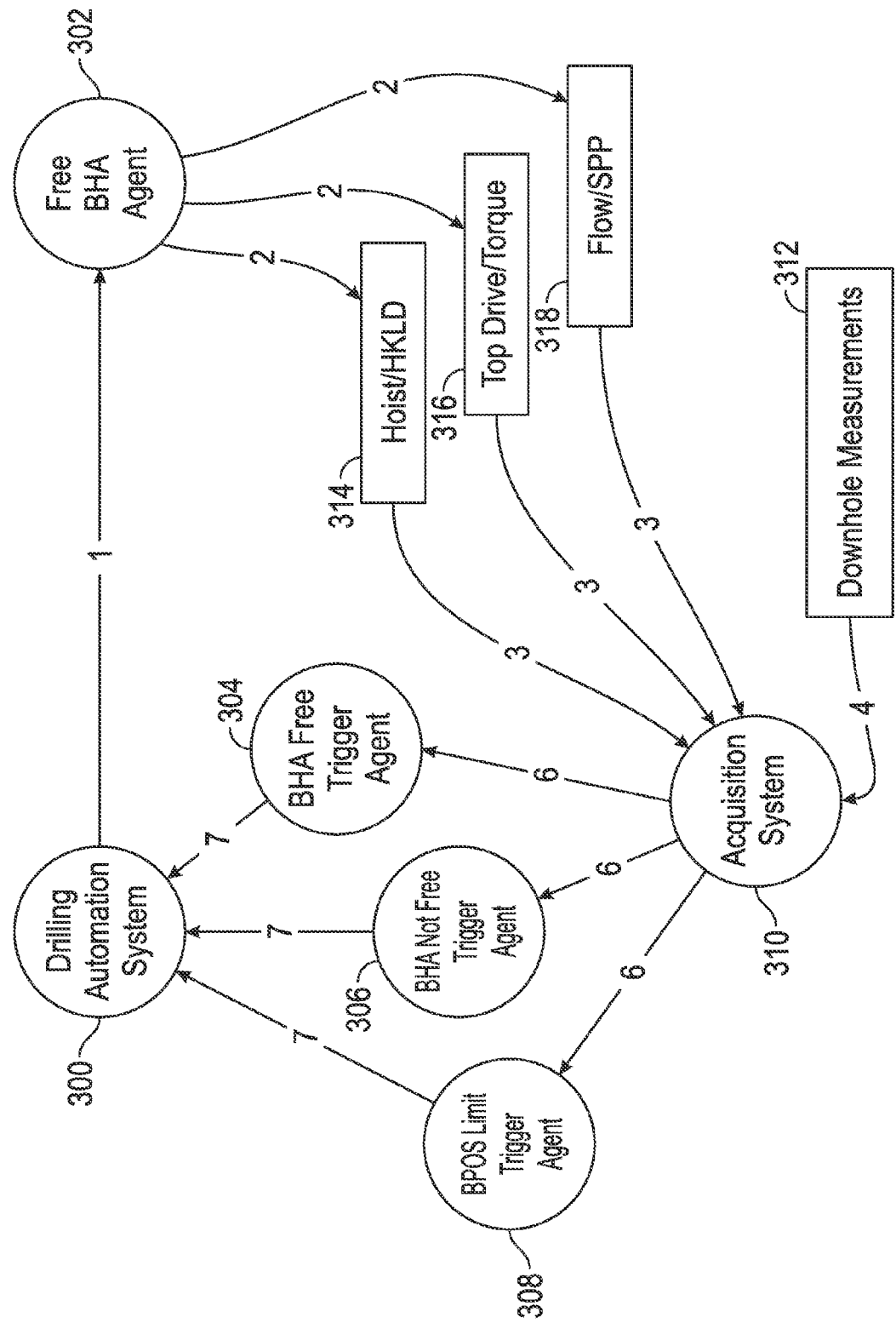
FIG. 16 is a block diagram illustrating the interaction of components in the system of FIG. 12 during a Free BHA phase.

FIG. 16 illustrates one example embodiment of a drilling automation system 300 with a Free BHA Agent 302 that may be used to implement the action for Free BHA phase 284 of phase machine 280 of FIG. 15. In addition, three trigger agents, BHA Free trigger agent 304, BHA Not Free trigger agent 306, and BPOS Limit trigger agent 308, are provided to handle triggers for the Free BHA phase.

Also illustrated is an acquisition system 310, e.g., Maxwell or IDEAL acquisition systems available from Schlumberger, in the drilling system, which collects real-time data, including downhole measurements 312 from the BHA, as well as other real-time data, e.g., HKLD 314 from a hoist system, torque/STOR 316 from a top drive, and flow rates and/or standpipe pressure (SPP) 318.

During the Free BHA phase, Free BHA agent 302 coordinates a BPOS change upward (i.e., a lifting of the drill string by the hoist system) while monitoring HKLD. BHA is Free trigger agent 304 examines HKLD to determine if HKLD is indicating that the BHA is sliding upward. If this trigger fires, a transition to the next phase in the normal drilling process is performed. BHA is Not Free trigger agent 306, on the other hand, examines HKLD to determine if HKLD is getting too close to an Overpull Limit (which may, for example, be established by a limit agent. If this agent fires, it transitions to a phase to initiate a procedure to handle BHA sticking. BPOS Limit trigger agent 308 is a global trigger that ensures the BPOS stays within a global limit, e.g., to ensure that the block does not run into a crown saver. If this trigger fires, it may transition to a phase to alert an operator and stop the block.

As represented by the numbered-arrows in FIG. 16, during the Free BHA phase, drilling automation system 300 activates Free BHA agent 302, which then controls the hoist system to raise the BHA. During this process real-time data is collected from sensors 314, 316, 318 and from downhole measurements by acquisition system 310, while each of trigger agents 304-308 monitors for trigger conditions until one of the trigger agents fires, and initiates a trigger event in drilling automation system 300, which then handles the transition to the appropriate phase associated with the trigger event.

Figure 17:
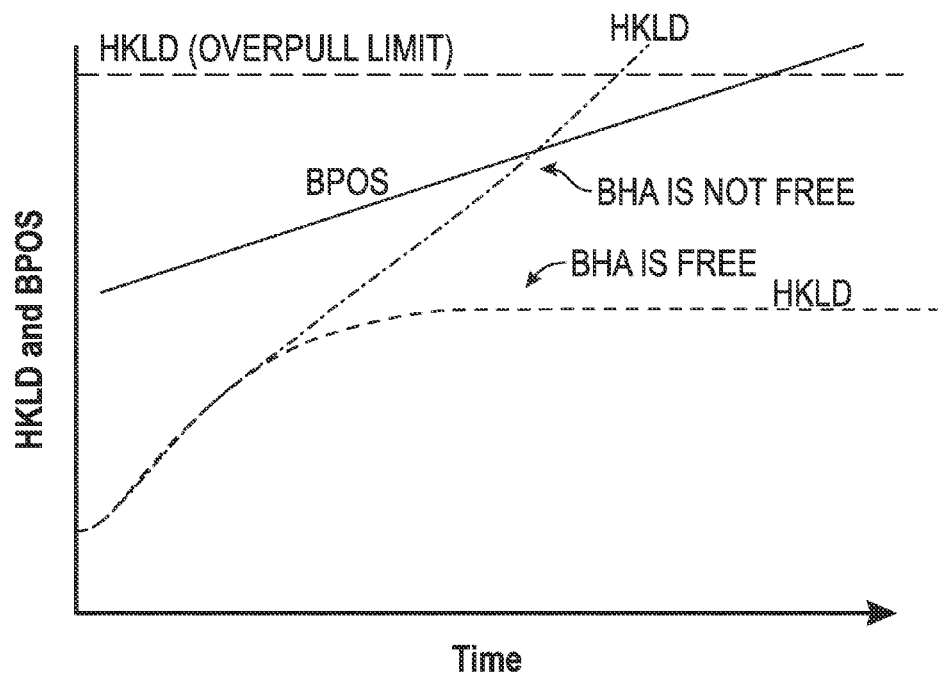
FIG. 17 is a graph of hook load and bit position vs. time for the system of FIG. 12 during a Free BHA phase.

FIG. 17 illustrates an example HKLD vs. time curve that may be implemented in agents 304-308 to determine whether the BHA is free. It will be appreciated that implementation of an action agent to effect this control over the drilling system, as well as trigger agents to monitor these parameters over time based upon this curve, would be well within the abilities of one of ordinary skill in the art having the benefit of the instant disclosure.

Start Circulation

The Start Circulation phase is generally used to start the mud pump (drilling fluid circulation system), e.g., to remove cuttings from the wellbore and to power downhole components that depend upon generators or turbines. Agents associated with this phase may start available pumps and attempt to ensure that the entire hydraulic system is in a state suitable to start pumps, which may be useful in minimizing potential non-productive time due to unexpected events, such as starting the pumps when: drill string is not connected, mud pump engines are off, one or more pumps or engines are under maintenance, flow lines are not Connected, there is inadequate mud available, pop-off valves are open, pipe screen not inserted, etc. Additionally, in some embodiments, the agents may minimize lost time between processes by quickly responding and validating current conditions faster than could be performed by a human, further shaving valuable seconds off the drilling operation.

Figure 18:
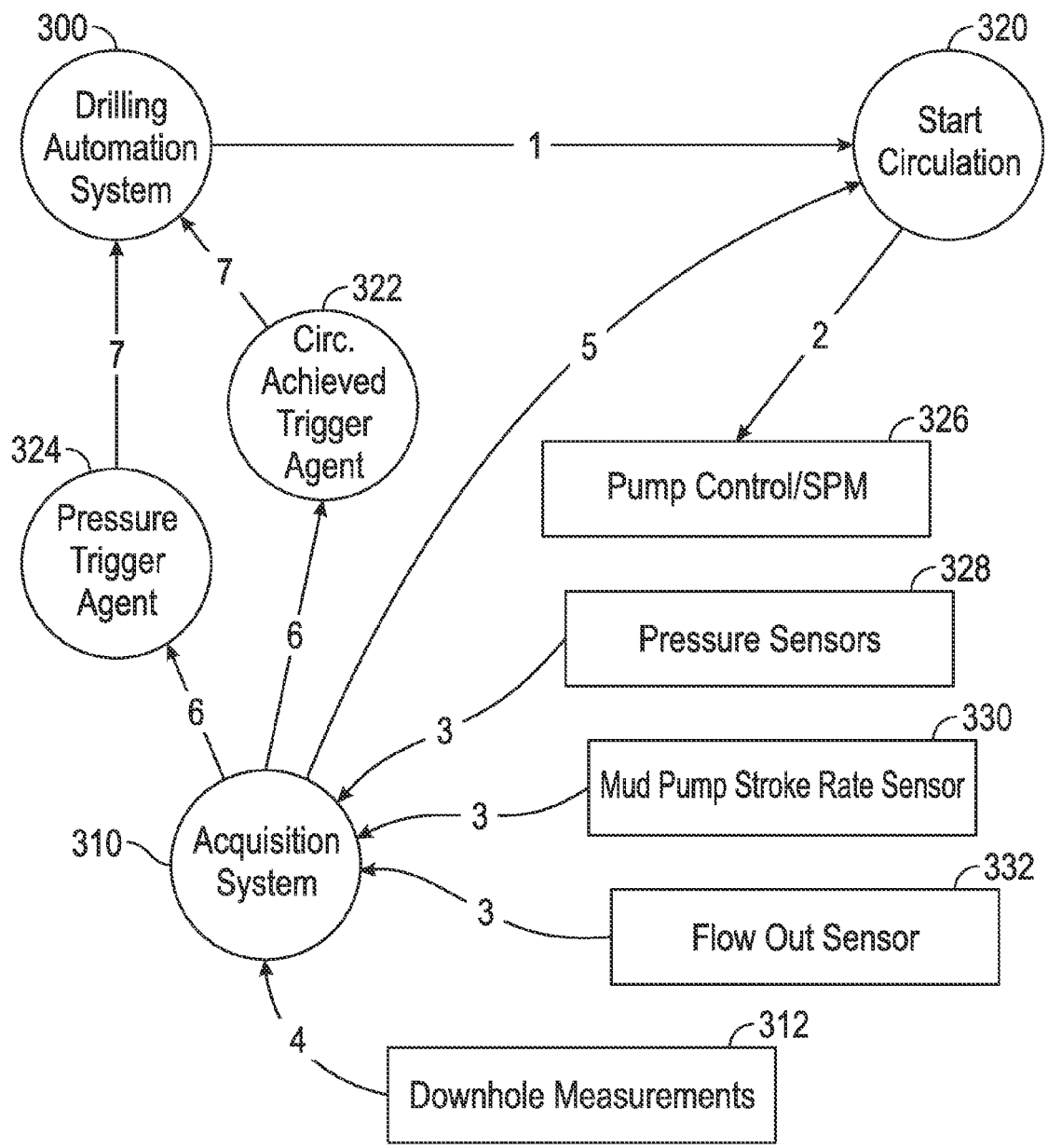
FIG. 18 is a block diagram illustrating the interaction of components in the system of FIG. 12 during a Start Circulation phase.

FIG. 18 illustrates one example embodiment of a Start Circulation agent 320 coupled to drilling automation system 300 to implement the action for Start Circulation phase 286 of phase machine 280 of FIG. 15. In addition, two trigger agents, Circulation Achieved trigger agent 322 and Pressure trigger agent 324, are provided to handle triggers for the Start Circulation phase.

Primary control over the phase is performed by controlling one or more mud pumps 326, e.g., by controlling strokes per minute (SPM). Also illustrated in FIG. 18 are additional real-time data collected by acquisition system 310 that are relevant to this phase, including readings from various pressure sensors 328, a mud pump stroke rate sensor 330 and a flow out sensor 332.

Trigger agents 322 and 324 monitor to determine if the circulation has been achieved or if some issue in starting the circulation has occurred, such as blocked annulus. For example, Circulation Achieved trigger 322 may be configured to examine flow-in and flow-out to ensure that the two are close to one another as flow-in ramps up. Initially, as flow-in starts, the gel strength of the mud may prevent flow until adequate pressure has been achieved. At this point, the mud begins to flow. In some embodiments, rheology models may be used to model the flow behavior of mud to determine if the pressures and flow-out are behaving within an expected range. Pressure trigger agent 324, in contrast, may be configured to trigger if expected flow or pressures are out of an expected range or outside of a limit, such as maximum SPP.

As represented by the numbered arrows in FIG. 18, during the Start Circulation phase, drilling automation system 300 activates Start Circulation agent 320, which then controls mud pump 326 to start circulation. Real-time data is collected from sensors 328, 330 and 332 and from downhole measurements 312 by acquisition system 310, and provided back to agent 320 to implement closed-loop control. Each of trigger agents 322-324 monitors for trigger conditions until one of the trigger agents fires, and initiates a trigger event in drilling automation system 300, which then handles the transition to the appropriate phase associated with the trigger event.

In one embodiment, agent 320 may be configured to initially examine the overall system, e.g., various rig sensors on mud pumps, valves, etc., and in some instances, provide a user interface to ensure that it is possible to start circulation safely. The agent may also be configured to engage the clutch on the pumps to bring the pumps up to idle speed. Additionally, the agent may be configured in some embodiments to send an event that it is starting the pumps so any alarms or backup systems would know that circulation was being started.

It will be appreciated that implementation of an action agent to effect this control over the drilling system, as well as trigger agents to monitor these parameters, would be well within the abilities of one of ordinary skill in the art having the benefit of the instant disclosure.

Start Rotation

The Start Rotation phase is generally used to start rotation of the top drive. An agent that performs this action may ensure that the rotary system is available either through sensors, some global flag in the system, and/or through a user interface to an appropriate operator (e.g., the Driller). One the agent determines the rotary system is available, it can set gears and perform any pre-system actions necessary to start the top drive, in the right direction, at the desired speed.

Figure 19:
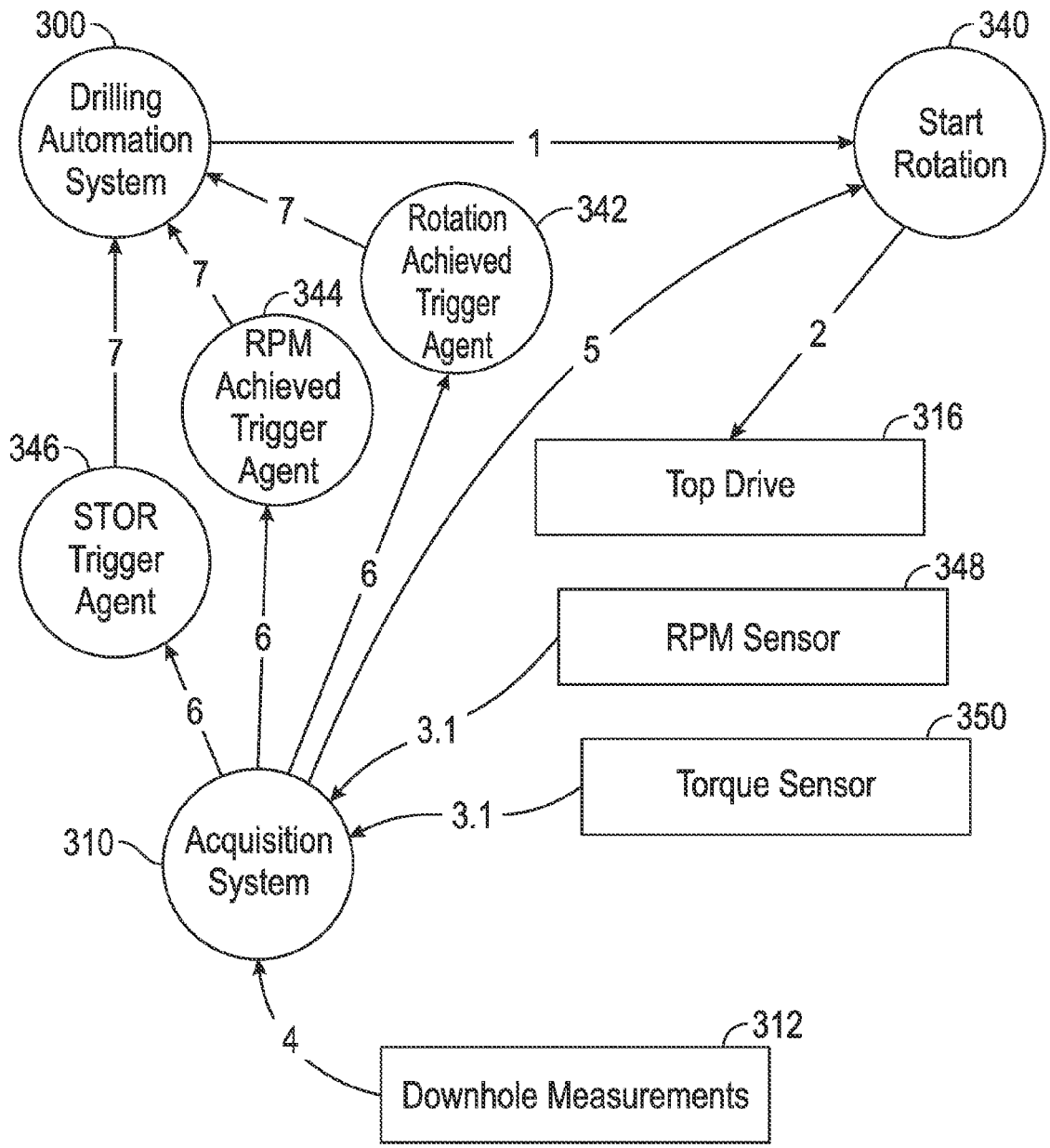
FIG. 19 is a block diagram illustrating the interaction of components in the system of FIG. 12 during a Start Rotation phase.

FIG. 19 illustrates one example embodiment of a Start Rotation agent 340 coupled to drilling automation system 300 to implement the action for Start Rotation phase 290 of phase machine 280 of FIG. 15. In addition, three trigger agents, Rotation Achieved trigger agent 342, RPM Achieved trigger agent 344 and STOR trigger agent 346, are provided to handle triggers for the Start. Rotation phase.

Primary control over the phase is performed by controlling top drive 316. Also illustrated in FIG. 19 are additional real-time data collected by acquisition system 310 that are relevant to this phase, including readings from an RPM sensor 348 and a torque sensor 350 for the top drive.

Trigger agents 322-326 monitor to determine if the rotation has been achieved or if some issue in starting the rotation has occurred. Rotation Achieved trigger agent 322 monitors RPM and STOR to determine when a desired drill string rotation has been initiated. RPM Achieved trigger agent 324 monitors RPM and STOR to determine when the desired RPM is achieved and STOR is steady, whereby the system knows that the drill string is all rotating at desired RPM and not stuck anywhere down its length. Noise filtering may also be applied to the STOR reading by the agent in some embodiments. Rotation Not Achieved trigger 326 detects when STOR continues to increase with RPM, which indicates that at some point along the drill string there is sticking that is causing the torque to continue to build up. The trigger may be configured in some embodiments to detect this condition prior to the pipe breaking and transition to a phase that stops the pipe rotation, set the Top Drive brake, and allow a manual intervention to fix the problem.

In some embodiments, it may be desirable to break the phase into multiple phases, e.g., so that the system achieves rotation and then transitions to a phase to increase rotation to a setpoint RPM.

As represented by the numbered arrows in FIG. 19, during the Start Rotation phase, drilling automation system 300 activates Start Rotation agent 340, which then controls top drive 316 to start rotation. Real-time data is collected from sensors 348 and 350 and from downhole measurements 312 by acquisition system 310, and provided back to agent 340 to implement closed-loop control. Each of trigger agents 342-346 monitors for trigger conditions until one of the trigger agents fires, and initiates a trigger event in drilling automation system 300, which then handles the transition to the appropriate phase associated with the trigger event.

Figure 20:
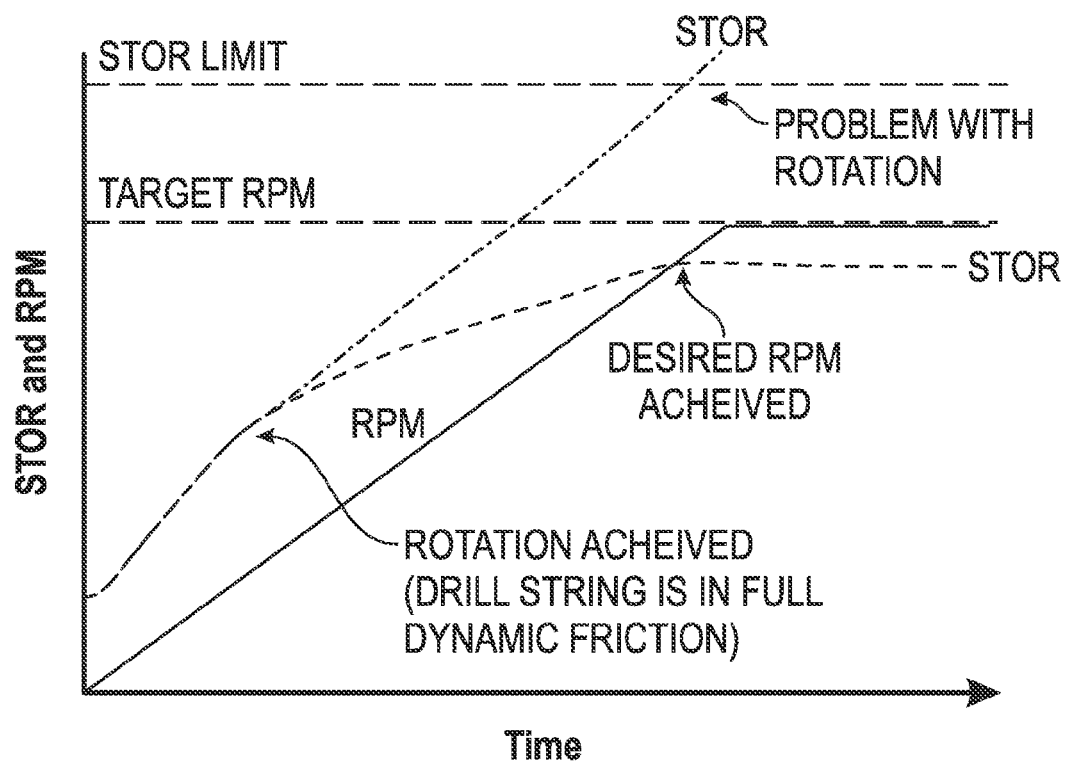
FIG. 20 is a graph of torque and speed vs. time for the system of FIG. 12 during a Start Rotation phase.

In one embodiment, agent 340 relies on a setting from a master plan or a global setting may specify what the target RPM should be for the top drive system to achieve as well as a maximum torque that may be provided to the top drive controller to stop the top drive from over torquing the pipe or parting it. Triggers 342-346 in one embodiment may examine RPM, STOR, and rotary system feedback to determine if any issues occur or if the action is complete. FIG. 20, for example, illustrates an example graph of STOR and RPM vs. time, illustrating sets of RPM and STOR values. The triggers may look for steady state (desired rotation achieved) and changes in slope (rotation achieved) using a data filtering technique such as ChangePoint to allow the detection of various stages of starting rotation.

It will be appreciated that implementation of an action agent to effect this control over the drilling system, as well as trigger agents to monitor these parameters over time based upon this curve, would be well within the abilities of one of ordinary skill in the art having the benefit of the instant disclosure.

Go-On-Bottom

Figure 21:
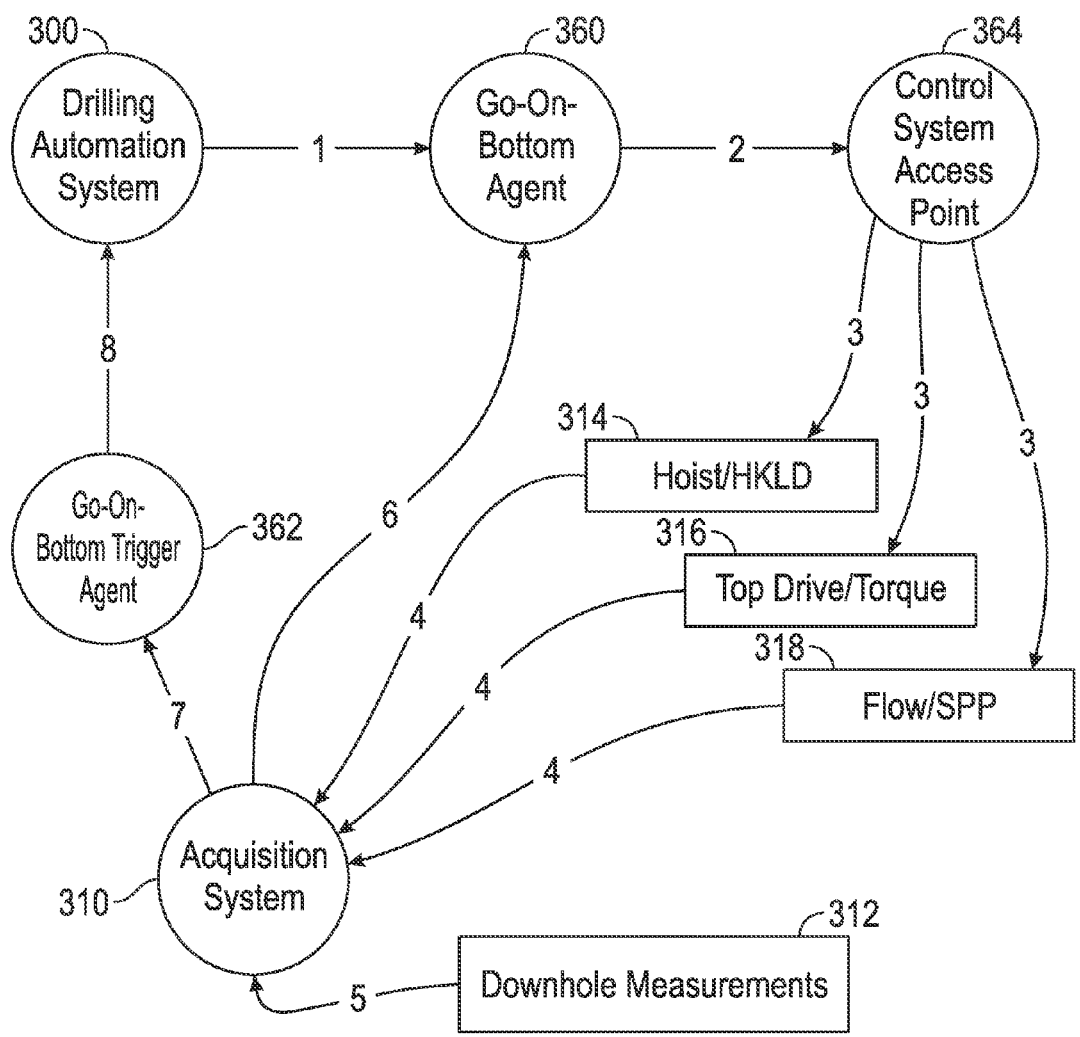
FIG. 21 is a block diagram illustrating the interaction of components in the system of FIG. 12 during a Go-On-Bottom phase.

The Go-On-Bottom phase is generally used to move the bit to the bottom of the well bore prior to drilling. FIG. 21 illustrates one example embodiment of a Go-On-Bottom agent 360 coupled to drilling automation system 300 to implement the action for Go-On-Bottom phase 292 of phase machine 280 of FIG. 15. In addition, one trigger agent, Go-On-Bottom trigger agent 362, is provided to handle triggers for the Go-On-Bottom phase.

As represented by the numbered arrows in FIG. 21, during the Go-On-Bottom phase, drilling automation system 300 activates Go-On-Bottom agent 360, which then sends commands to move the drill string down using a hoisting system control while maintaining RPM and flow at levels appropriate for this stage via digital access point 364. Agent 360, with knowledge of factors such as the well condition, bit type/condition, BHA, fluid, flow rates, rig status, added drillpipe (and its length), cable stretch, and real-time data from surface and downhole equipment, may be configured to implement best practices for going on bottom with the various bit types in the hole as well as taking into account the condition of the bottom of the hole so as to establish a good cutting pattern (as an example).

Real-time data from hoisting system 314, top drive 316 and SPP 318 is fed back via sensors to acquisition system 310, and real-time downhole data is transmitted to the acquisition system through some medium (e.g., wired pipe, electromagnetic pulse, or mudpulse). Processed real-time data is transmitted back to agent 360 to provide feedback on its control of the surface equipment, as well as to Go-On-Bottom Trigger agent 362, which looks for changes in STOR, HKLD, and pressure (e.g. SPP), as well as bit depth, to get an indication of the bit contacting the bottom. Bit depth may be computed, for example, using measured depth or accounting for strain along the length of the drill string and BHA. When satisfied that the bit is on bottom, trigger agent 362 initiates a trigger event in drilling automation system 300, which then handles the transition to the next phase.

In the illustrated embodiment, agent 360 implements best practices for going on bottom. These actions may be capable of optimizing the cutting pattern and bit life substantially, and as such, performing this process in an automated fashion may further improve reliability, performance, as well as minimize other drilling issues. Determining when the bit is engaging bottom as well as cuttings that have fallen to the bottom during the connection may also be used to assure the hole is not damaged, often resulting in less damage occurring to the bit.

In this regard, trigger agent 362 may analyze a variety of measurements on surface to determine if the bit has tagged bottom, including, for example, HKLD should decrease as the bit takes weight, STOR should increase as the bit's cutters begin to engage with the bottom, and SPP will increase as the bit's nozzle flow starts to encounter more resistance or if a mudmotor is running as the bit reaches bottom.

Figure 22:
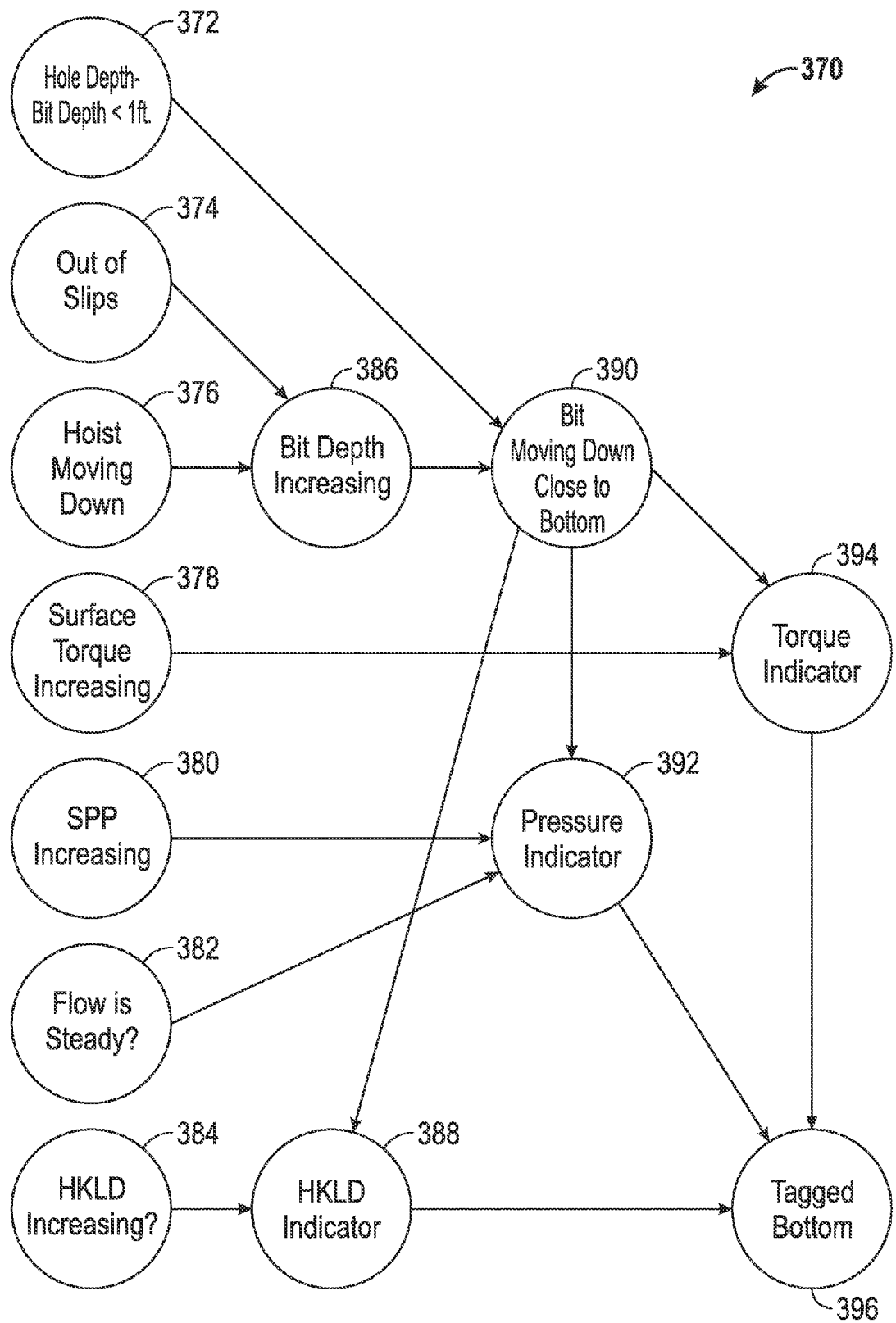
FIG. 22 is a block diagram of an example Bayesian network used to determine when a bit has reached bottom in the system of FIG. 12 during a Go-On-Bottom phase.

In one embodiment, change point questions may be written to examine these real-time surface measurements to determine when an increase in any of the aforementioned conditions occur. Further, Bayesian logic may be used in some embodiments to combine these signals (along with hole depth and bit depth) to give a probabilistic indication of the bit tagging bottom. FIG. 22, for example, illustrates one such network 370 that includes nodes that analyze whether the different between the hole depth and bit depth is less than 1 ft (node 372), out of slips (node 374), hoist moving down (node 376), STOR increasing (node 378), SPP increasing (node 380), steady flow (node 382) and HKLD increasing (node 384). Node 386 determines whether bit depth is increasing based upon nodes 374 and 376, and node 390 determines if the bit is moving down close to bottom based upon nodes 372 and 386. Node 388 determines a HKLD indicator based upon nodes 384 and 390 and node 392 determines a pressure indicator based upon nodes 380, 382 and 390. Node 394 determines a torque indicator based upon nodes 378 and 390, and node 396 ultimately determines a tagged bottom based upon the HKLD, pressure and torque indicators (nodes 388, 392 and 396). It will be appreciated that other conditions, logic and/or algorithms may be used in the alternative to determine a tagged bottom.

It will also be appreciated that implementation of an action agent to effect this control over the drilling system, as well as trigger agents to monitor these parameters, would be well within the abilities of one of ordinary skill in the art having the benefit of the instant disclosure. Furthermore, it should be noted that while FIG. 21 illustrates Go-On-Bottom agent 360 interacting with drilling rig and other process components through control system access point 364, various alternate mechanisms for controlling drilling rig and other process components via agent 360 may be used in other embodiments, and access point 364 may be omitted in some embodiments. Likewise, for other agents that interact with drilling rig and other process components, e.g., Free BHA agent 302, Start Circulation agent 320, Start Rotation agent 340, and Drill Ahead agent 400 and Trip agent 420 may control drilling rig and other process components through access point 364 in some embodiments.

Drill-Ahead

The Drill-Ahead phase is initiated once the Go-On-Bottom phase has positioned the bit on the bottom of the well bore. In this phase, drilling may pass between rotary and slide drilling, which in some embodiments may be considered sub-phases in themselves. In the Drill-Ahead phase, external agents are activated by sending a signal to them that they are active as well as allowing them to control if the agents are in a Ready state.

An event mechanism that allows agents to register for events, either directly or by registering as an agent in the manner described above, is present in the drilling automation system to communicate from the EM to all interested agents/clients. This mechanism allows interested agents to understand the drilling process and when they should modify their behavior for a particular drilling sequence. For example, in the case where a downlink is occurring, it may be desirable to notify a kick alarm so it expects changes in flow rate to prevent false alarms.

The Drill-Ahead phase, similar to other phases described herein, allows agents registered to be activated during this phase to take control of the top drive, hoisting system (e.g., via an autodriller), and mud-pumps. Multiple agents may be provided to control different pieces of equipment, and based upon what equipment is installed in a given drilling rig. For example, when a drilling rig is so equipped, a Rotary Steerable System (RSS)-capable agent or tool may be used to control steering settings during the Drill-Ahead phase.

As illustrated by this phase, in some embodiments multiple agents may be used concurrently to control different pieces of equipment. Nonetheless, in some embodiments only one agent may be permitted to be in direct control of any piece of equipment at any specific time. In addition, in some embodiments; to ensure that drilling occurs properly, it may be desirable to move the bails or send a signal to move the bails out of position prior to drilling to Kelly-Down, which may necessitate the use of sensors to understand the bail position, e.g., a video image processing tool that uses a camera to look at the bails and determine if they are in a position that would interfere with the rig floor.

Figure 23:
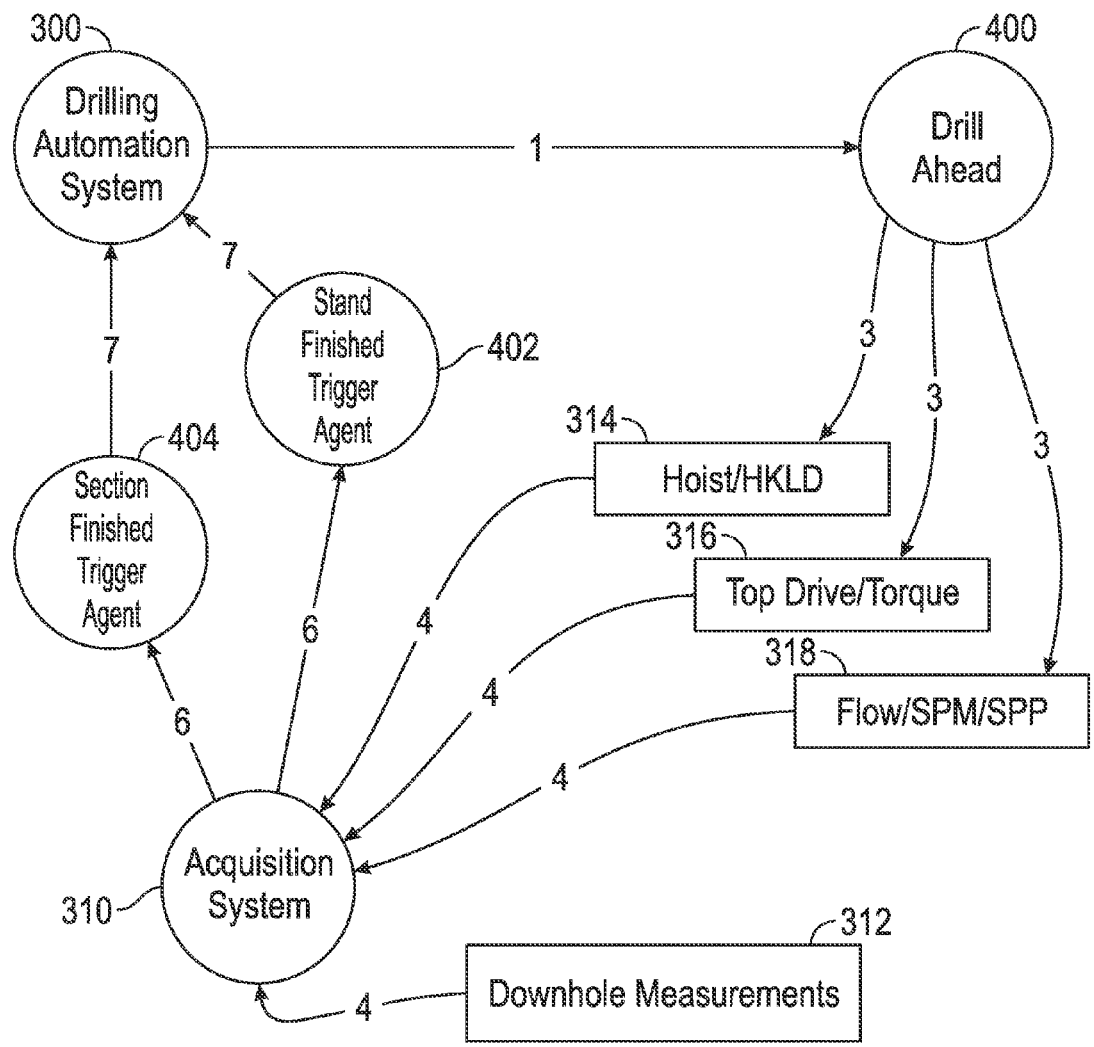
FIG. 23 is a block diagram illustrating the interaction of components in the system of FIG. 12 during a Drill Ahead phase.

FIG. 23 illustrates one example embodiment of a Drill-Ahead agent 400 coupled to drilling automation system 300 to implement the action for Drill-Ahead phase 294 of phase machine 280 of FIG. 15. In addition, two trigger agents, Stand Finished trigger agent 402 and Section Finished trigger agent 404, are provided to handle triggers for the Start. Rotation phase.

Primary control over the phase is performed by controlling hoist system 314, top drive 316 and mud pump flow.

Stand Finished trigger agent 402, which may also be implemented as a Kelly Down trigger agent, monitors BPOS (block position) and determines when the stand has been completely drilled. In some embodiments, the Kelly-Down position is a configurable setting for the drilling rig and setup for each rig. In some embodiments, a sub-trigger agent may be provided to provide an alarm as a result of the loss of or an inaccurate reading of the BPOS. This trigger agent may also examine "noise" in a BPOS signal and do some monitoring of block velocity (BVEL) to look for other unexpected block position errors. Section Finished trigger agent 404 monitors hole or bit depth and compares this to a master plan (discussed in greater detail below). If the depth for the section has been achieved, the trigger fires to indicate that the section is finished and moves into a phase of drill-off and eventually tripping out of hole.

As represented by the numbered arrows in FIG. 23, during the Drill Ahead phase, drilling automation system 300 activates Drill-Ahead agent 400, which then controls the hoist system, the top drive and the mud pumps to proceed with drilling along an intended trajectory. During this process real-time data is collected from sensors 314, 316, 318 and from downhole measurements 312 by acquisition system 310, while each of trigger agents 402-404 monitors for trigger conditions until one of the trigger agents fires, and initiates a trigger event in drilling automation system 300, which then handles the transition to the appropriate phase associated with the trigger event.

In some embodiments, additional triggers and/or trigger agents may also be supported. For example, a floor saver trigger may be used to monitor a floor saver alarm provided by the rig control system. If this trigger occurs it is likely that there is an issue with the BPOS sensor or Kelly Down position as the Kelly Down trigger would be expected to have fired before this alarm was triggered.

As another example, various equipment failure triggers and trigger agents may be used to monitor downhole equipment status. If a piece of equipment fails, such as bit, motor, RSS, telemetry, surveying, etc., a trigger may fire to transition to a manual state that requires the notification and eventual decision of a human operator. In some embodiments, equipment failure triggers may be active in additional phases beyond the Drill-Ahead phase.

As yet another example, equipment collision alarm/warming triggers may be used to for a potential collision sensed between two or more pieces of equipment. In some embodiments, such a trigger may be used to ensure an iron roughneck is not extended near the drill string, or the bails are not crashing into the rig floor.

Still another example is a human proximity alarm/warning trigger, which may monitor for a human in a potentially dangerous area related to the automated process. For example, if a human gets near the bails, which are potentially moved by an agent that is active, a human proximity alarm may be triggered. In some embodiments, for example, active location transmitters may be integrated into a human's HSE equipment and monitored may a trigger agent, or video processing techniques may be used to monitor video feeds around the drilling rig.

While not specifically shown in FIG. 23, various limits may also be established in connection with the Drill-Ahead phase, as many issues may potentially arise in this phase. Limits in this phase may include, but are not limited to, limits such as top drive RPM, STOR, and direction; hoist min/max positions; differential pressure; ROP; downhole equipment temperature; min/max flow rates; max SPP; block acceleration; top drive acceleration; equipment limits (e.g., flow, pressure, temperature, fatigue); rig equipment position limits (e.g., rig-anti-collision limits); offset trajectory distance limits; trajectory distance from plan limits; shock & vibration limits; shock level limits, etc. Given the wide variety of equipment that may be implemented in a drilling rig, as well as different subsurface and surface conditions that may be encountered, a wide variety of functionality may be utilized in the Drill-Ahead phase to automate the drill-ahead operation in a manner suitable for any given application.

It will be appreciated that implementation of an action agent to effect this control over the drilling system, as well as trigger agents to monitor these parameters, would be well within the abilities of one of ordinary skill in the art having the benefit of the instant disclosure.

Drill-Off

The Drill-Off phase is generally used to stop the blocks and continue top-drive rotation and pumping to keep the bit engaged while the hole is extended to remove compression in the drill string and leave a good cutting pattern on the bottom of the hole for the bit to re-engage into on a next stand of pipe. This phase assumes some process has occurred before it to get equipment to a state that it is ready to do a drill-off. During this phase, agents are notified to start the drill-off and triggers are defined to monitor the drill-off to ensure it has completed. In some embodiments, the drill-off operations performed in this phase are independent of any drill-off activity that may occur during ROP optimization during the Drill-Ahead phase, and is primarily directed to stopping drilling and readying for another phase, e.g., reaming, wiping, tripping out pipe or going to a connection.

Figure 24:
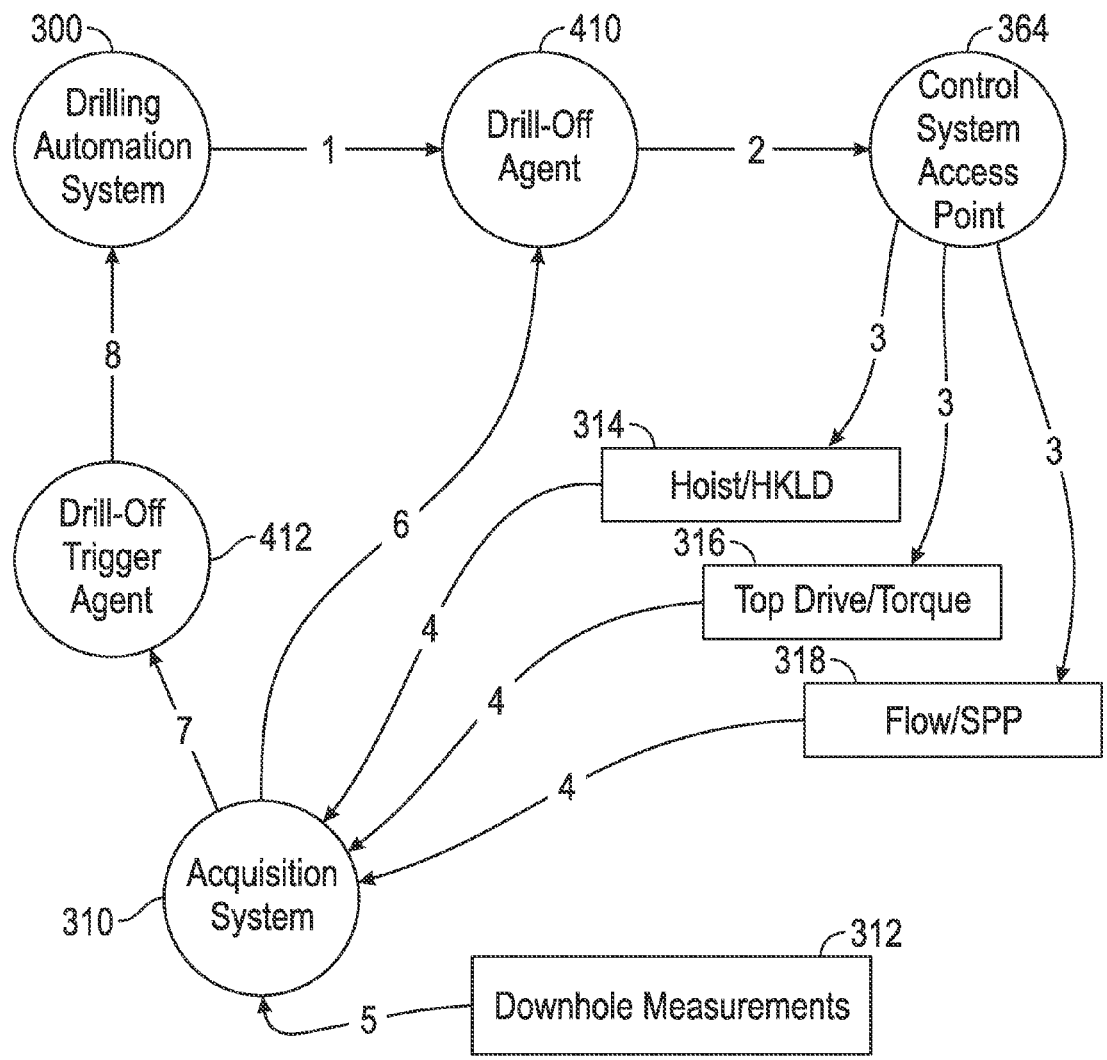
FIG. 24 is a block diagram illustrating the interaction of components in the system of FIG. 12 during a Drill-Off phase.

FIG. 24 illustrates one example embodiment of a Drill-Off agent 410 coupled to drilling automation system 300 to implement the action for Drill-Off phase 296 of phase machine 280 of FIG. 15. In addition, one trigger agent, Drill-Off trigger agent 412, is provided to handle triggers for the Drill-Off phase.

Agent 410 may be configured to look up a master plan or preset value for RPM and maintain that RPM during the Drill-Off. In some embodiments, the agent may be configured to adjust this RPM based upon the bit's cutter engagement or from detected shock and vibration. Trigger agent 412 may monitor for an expected event, such as an appropriate amount of WOB removed, or some unexpected event such as significant amount of shock-and-vibration detected.

As represented by the numbered arrows in FIG. 24, during the Drill-Off phase, drilling automation system 300 activates Drill-Off agent 410, which then sends commands to slow or stop the drill string downward movement using the hoist system control while maintaining RPM and flow at levels appropriate for this stage of drilling via one or more digital access points 364. In one embodiment, the agent may implement best practices for performing a drill-off with the particular bit type in the hole as well as taking into account the condition of the bottom of the hole. In particular, the agent may attempt to perform the drill-off smoothly to avoid damage to the BHA, well bore, and bottom hole. Additionally, the drill-off agent may monitor hole cleaning to ensure cuttings have been adequately removed from the hole as the process is running.

Real-time data from hoisting system 314, top drive 316 and SPP 318 is fed back via sensors to acquisition system 310, and real-time downhole data is transmitted to the acquisition system through some medium (e.g., wired pipe, electromagnetic pulse, or mudpulse). Processed real-time data is transmitted back to agent 410 to provide feedback on its control of the surface equipment, as well as to Drill-Off trigger agent 412, which looks for changes in STOR, HKLD, and pressure (e.g. SPP) to get an indication of when the phase is complete. Additional triggers (not shown) may also monitor for other conditions, e.g., excessive shock or vibration.

When satisfied that the drill-off is complete, trigger agent 412 initiates a trigger event in drilling automation system 300, which then handles the transition to the next phase.

Drill-Off trigger agent 412 may be configured to WOB, e.g., static WOB (SWOB) and/or dynamic WOB (DWOB) to determine if an appropriate amount of WOB has been taken off the bit. In some embodiments, the appropriate amount of WOB for a given application may be pre-computed or computed on the fly using a torque and drag application to estimate pipe stretch in order to limit the amount of time during this activity. The trigger agent may also analyze a variety of other measurements on surface to determine if the drill-off is complete, e.g., monitoring that HKLD increases as the drill string unloads with the continued drilling due to rotation, that STOR decreases as the bit's cutters cut less and less rock, that SPP decreases as the bit's nozzle flow resistance is removed, and that DWOB and dynamic torque (DTOR) move towards zero. In one embodiment, stochastic algorithms may be used to examine one or more of the surface and downhole measurements to determine when the system has completed the drill-off.

In some embodiments, an additional shock/vibration alarm/warning trigger agent (now shown), may be used to detect an unexpected event such as excessive shock/vibration as the bit unloads. The trigger agent may cause top drive RPM to be changed to mitigate this symptom so the drill-off can continue, e.g., by integrating such functionality into the drill-off agent performing the action instead of transferring to another phase to mitigate the event. In addition, in some embodiments, artificial intelligence methodologies, such as case based reasoning, neural networks, and fuzzy logic, may also be used to determine when the trigger has tripped. It will also be appreciated that in other agents, artificial intelligence methodologies may also be implemented to handle actions, triggers, validators and/or limits for various phases in a phase machine.

It will also be appreciated that implementation of an action agent to effect this control over the drilling system, as well as trigger agents to monitor these parameters, would be well within the abilities of one of ordinary skill in the art having the benefit of the instant disclosure.

Trip Pipe

An additional phase, not illustrated in FIG. 16, is a trip pipe phase, which may be used to trip pipe either in or out of the well bore.

Figure 25:
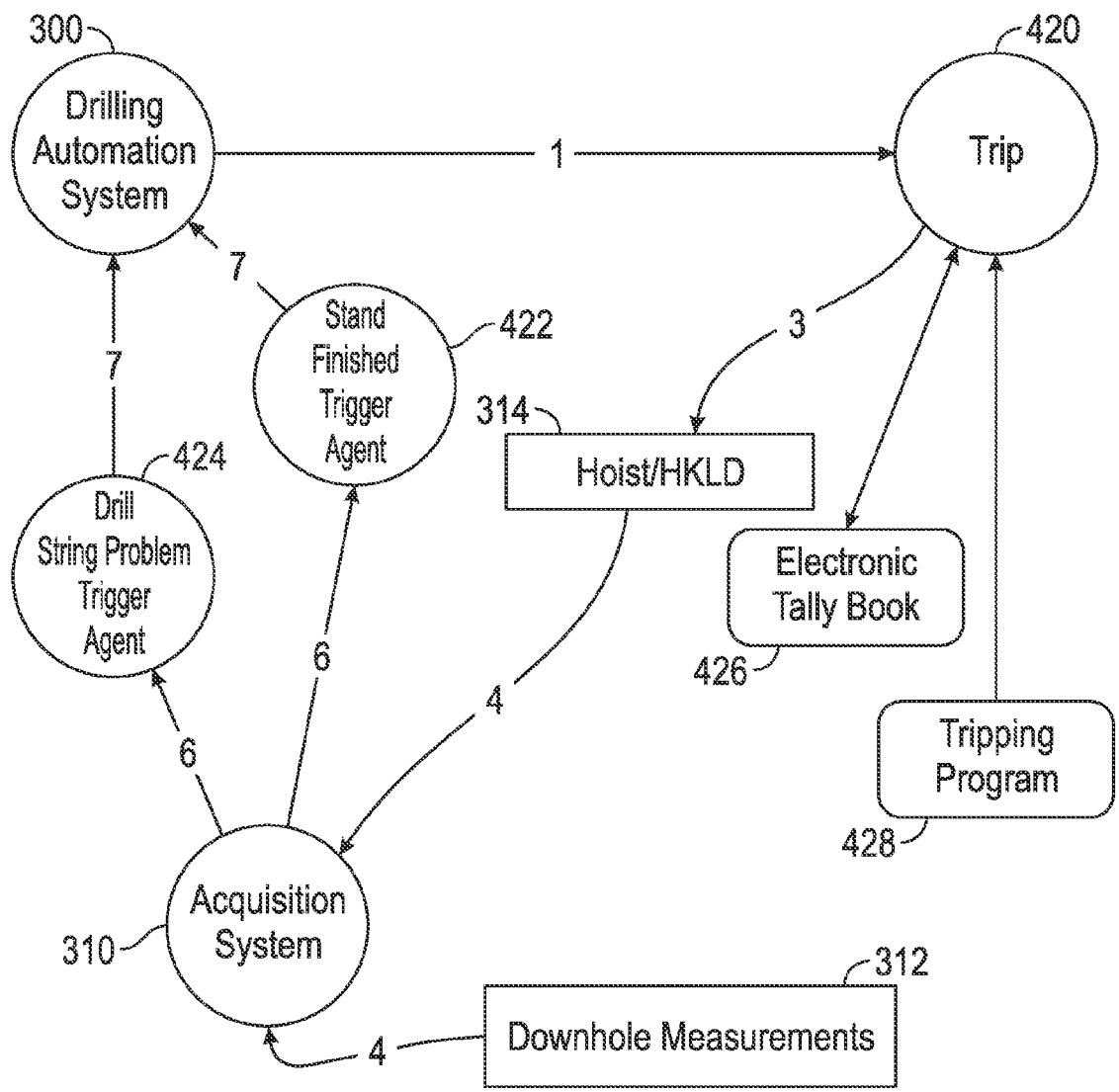
FIG. 25 is a block diagram illustrating the interaction of components in the system of FIG. 12 during a Pipe Trip phase.

FIG. 25 illustrates one example embodiment of a Trip agent 420 coupled to drilling automation system 300 to implement the action for a Trip phase. In addition, two trigger agents, Stand Finished trigger agent 422 and Drill String Problem trigger agent 424, are provided to handle triggers for the Trip phase.

Primary control over the phase is performed by controlling hoist system 314. Also illustrated in FIG. 19 is input from an electronic tally book 426 and tripping program 428. The phase may first validate that the context is correct (e.g., BHA, well bore, and rig equipment operational status, etc.). Agent 420 may move the pipe to the correct BPOS to allow addition or removal of drill pipe at an optimal speed and acceleration to minimize time and maintain well bore stability. Using an electronic data base of pipe lengths stored in book 426, the BPOS when tripping out may be performed to get the tool joint to the optimal location so that the iron roughneck may operate optimally. The speeds and accelerations may be pre-computed, e.g., based upon tripping program 428, or use real-time analysis to determine the correct settings.

Stand finished trigger agent 422 may be configured to fire when the desired BPOS has been obtained and brakes have been set. An additional trigger may be provided in some embodiments to trigger on an at bottom condition, e.g., to determine when a tripping sequence is finished based upon a particular hole depth or bit depth objective. Drill String Problem trigger agent 424 may implement multiple triggers, e.g., an overpull trigger, to detect an unexpected event occurring while tripping out that has caused the drill string to stick, and a hangup trigger, to detect an unexpected event occurring while tripping into the hole that has caused the BHA to hang up and prevent tripping in.

It will be appreciated that implementation of an action agent to effect this control over the drilling system, as well as trigger agents to monitor these parameters over time based upon this curve, would be well within the abilities of one of ordinary skill in the art having the benefit of the instant disclosure.

Automatic Survey Acceptance

As noted above a survey, within the context of the disclosure, attempts to determine the orientation of a BHA in the well bore using a downhole survey device, e.g., an MWD tool in a BHA. Automatic survey acceptance is a phase including one or more agents that is responsible for detecting when a downhole survey has been taken. Using the herein-described functionality to determine the moment a survey has been taken and its quality can increase drilling efficiency and help drive the drilling automation process. In contrast, conventional drilling rigs typically require human operator involvement and authorization to sign off on a survey and, if necessary, to correct a bad survey.

In some embodiments of the invention, for example, functionality may be provided to correct a faulty survey in parallel with restarting a BHA to repeat a survey (a process that typically involves stopping the mud pump, waiting until the BHA shuts down, and then restarting the mud pump to boot up the BHA and repeat the survey).

Figure 26:
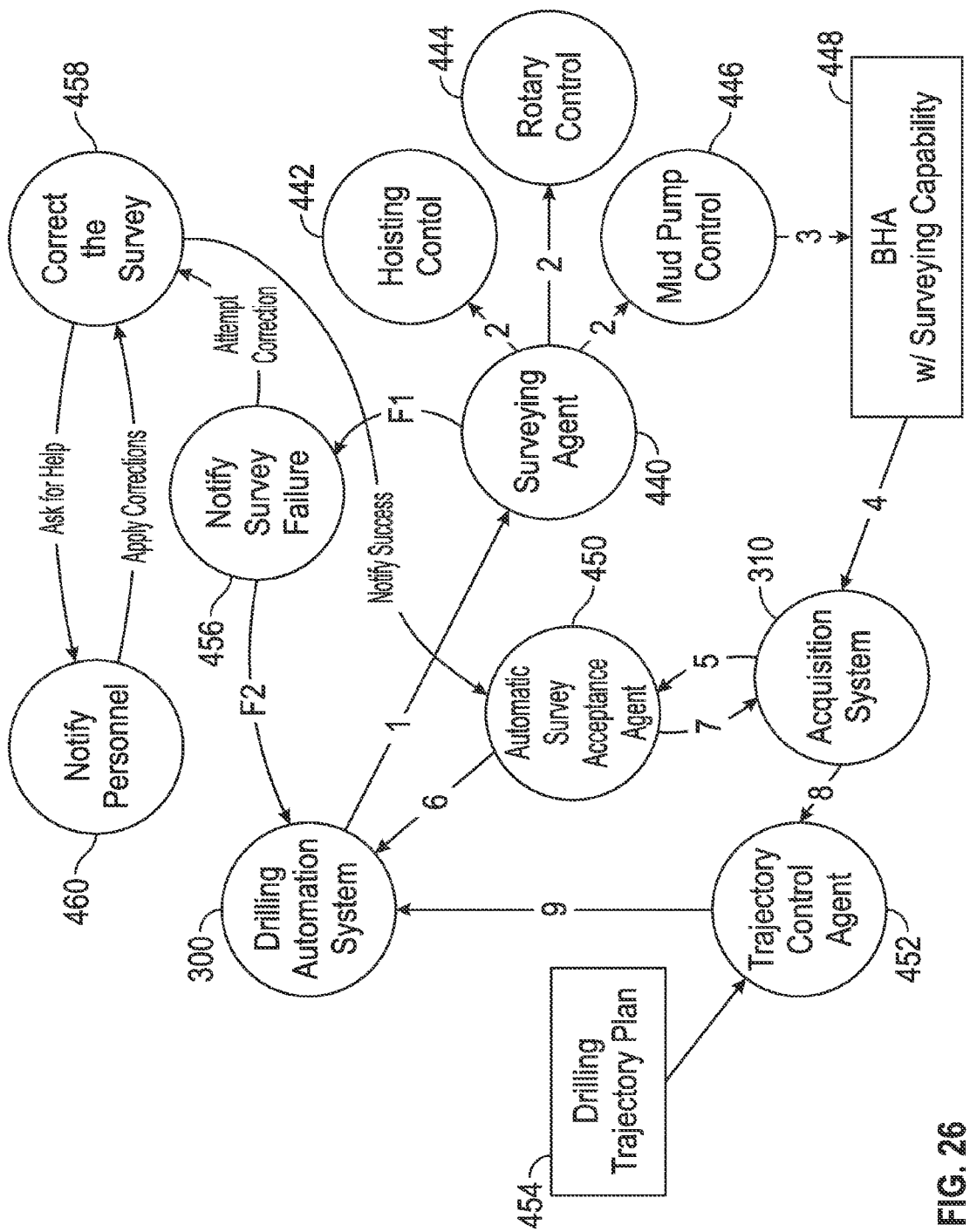
FIG. 26 is a block diagram illustrating the interaction of components in the system of FIG. 12 during a Automated Survey Acceptance phase.

FIG. 26, for example, illustrates the integration of automatic survey acceptance into a drilling automation system 300. In this embodiment, the drilling automation system activates a surveying agent 440, as well as an automatic survey acceptance (ASA) agent 450, which first validates that the drilling system is in a condition to begin the survey process. In this step, the agent ensures that the entire drilling system including the surface and downhole equipment is in the correct operating condition to begin the survey process. Particularly, it may consider the MWD tool state, which depends on some description of the tool in a user configurable file, such as a WITSML BHA description. If the drilling system is not the case, the agent may fail validation, and the drilling automation system may initialize a process to get the drilling system into a compatible state, which may be a manually actuated process.

Figure 27:
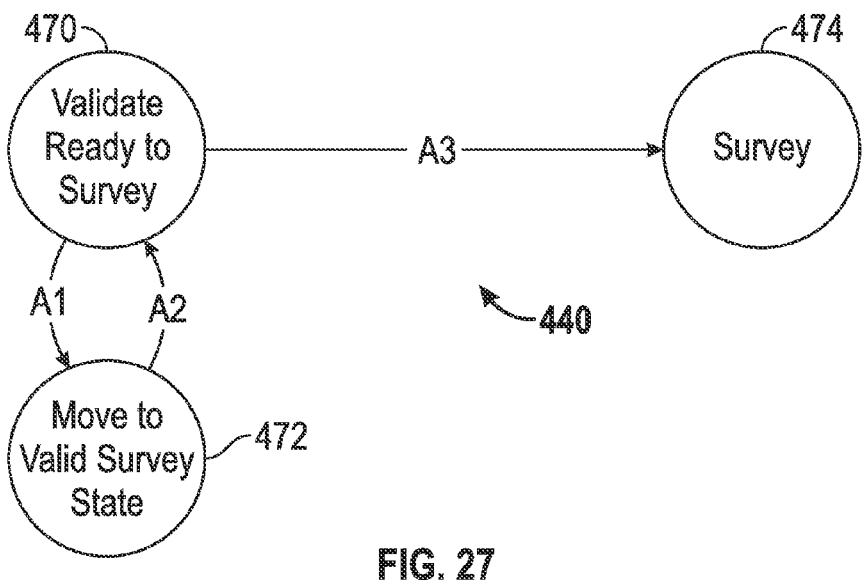
FIG. 27 is a block diagram of sub-agents that may be used to implement the automated survey acceptance agent referenced in FIG. 23.

Turning briefly to FIG. 27, in one embodiment survey agent 440 is implemented by a set of agents 470, 472 and 474 that work together to run the entire process. For example, this diagram shows a set of actions that may be contained by the ASA as sub-agents of the ASA agent. Here, the drilling system state is validated by sub-agent 470, if that fails it goes along A1 to sub-agent 472 to move to a valid survey state, and when that is accomplished, the validation is again performed by moving along the A2 line back to sub-agent 470. If validation fails again, the process may fail altogether, or re-validate. If validation passes, the process moves along A3 to sub-agent 474 to begin taking the survey.

Returning to FIG. 26, survey agent 440 is capable of controlling hosting control 442, rotary control 444 and mud pump control 446, and initiates a survey by activating mud pump control 446 to initiate the downhole MWD system to take a survey while holding the drill pipe steady, i.e., by setting block velocity to zero and rotation to zero. Next, as illustrated at 448, the MWD system boots and may or may not take a survey and then transmits the survey uphole using any of a number of communication media such as mud pulse telemetry or a wired drill pipe. The survey is sent to acquisition system 310, where it demodulates the signal and constructs the survey.

Next, ASA agent 450 detects the survey in the system and determines its quality based upon an acceptance criteria. The acceptance criteria may ensure that survey data is not corrupted by noise when transmitted from downhole to surface, e.g., based upon the bit confidence generated by telemetry demodulation and the parity bits or error correction coding. Next, the received survey value may be automatically compared with a quality threshold, e.g., one or more predefined thresholds or models, and in some embodiments, an operator may be permitted to manually override decisions made by the algorithms in terms of quality. Additionally, the ASA agent may provide the operator with the survey and relevant parameters such as field strength and detected field strength, an estimate survey vs. survey taken (to ensure the survey is close to expected), and other information that may allow the operator to quickly determine if the survey can be accepted or rejected and provide operator authorization is appropriate. This manual step may also be turned on/off in some embodiments depending on operator preference.

Next, ASA agent 450 sends a signal to the drilling automation system that a good survey has been taken so it can proceed to the next phase in the drilling phase machine or that the survey is bad and it needs to get another survey by restarting the survey process. In addition, ASA agent 450 forwards the survey quality indicator back to acquisition system 310.

In one embodiment, the survey along with its quality indicator is sent to a Trajectory Control agent 452, which integrates the new survey to compute the position of the well bore, and if appropriate sends the drilling automation system a request to change the drilling direction, e.g. a downlink to an RSS tool, a different TF or slide/rotate ratio, etc., e.g., as based on a drilling trajectory plan 454 or master plan.

In the event that the drilling state cannot be validated to be in a condition to take a survey or the survey cannot be validated (perhaps after re-trying a number of times), the drilling automation system may transition to a notify survey failure agent 456, where a correction is attempted by transitioning to a correct the survey agent 458 to attempt to correct the survey, which may optionally include notifying personnel via a notification agent 460 to receive corrections, or alternatively performing corrections automatically. Upon a successful correction a notification may be returned to ASA agent 450.

Figure 28:
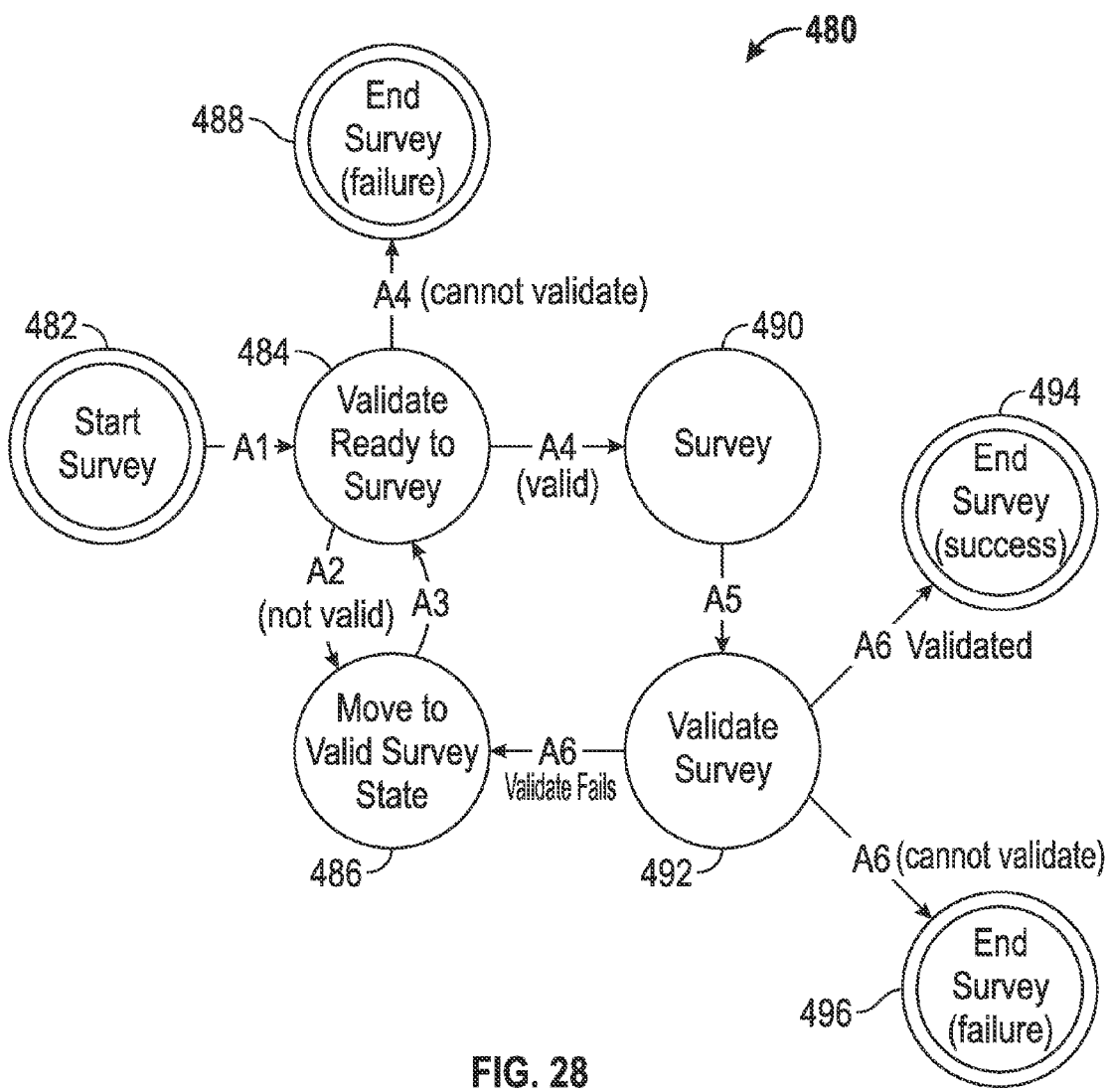
FIG. 28 is a phase diagram illustrating the interaction of components in the system of FIG. 12 during the Automated Survey Acceptance Phase.

FIG. 28 illustrates from a high level the process that may occur within ASA agent 450 in one example embodiment of the invention. Starting in block 482, ASA agent 450 transitions to block 484 (A1) to validate that the drilling rig is in a state sufficient to survey. If not valid (A2), a transition occurs to block 486 to move to a valid survey state, and once a valid survey state is achieved, control returns to block 484 (A3).

If validation cannot be obtained (A4-cannot validate), control passes to block 488 to end the survey with a failure indicated. Otherwise, control passes to a survey block 490 (A4-valid) to initiate a survey. Once the survey is complete, control passes to block 492 to validate the survey. If the validation fails (A6-validate fails) control returns to block 486 to repeat the survey after returning to a valid survey state. Otherwise, if the survey is validated (A6-validated) control passes to block 494 to end the survey with success indicated. Furthermore, if the survey, cannot be validated (A6-cannot validate), control passes to block 496 to end the survey with a failure indicated.

It will be appreciated that implementation of the ASA agent and other functionality to implement the herein-described survey functionality would be well within the abilities of one of ordinary skill in the art having the benefit of the instant disclosure.

Master Plan

It may be desirable in some embodiments to further automate a drilling process through the use of a master plan, which may be used to assist a phase machine in controlling how to Drill-A-Stand, or Drill-A-Section. A master plan may have parameters correlated by time and/or space, e.g., based upon an absolute depth, a relative position or depth, a position relative to geological features such as formations, faults, or layers, topography, or other measurements that may be obtained in the course of an oil & gas process, as well as what to do for particular events within a particular context.

For example, some drilling simulators, e.g., Osprey Risk available from Schlumberger, may be used to generate an AFE (authorization for expenditure) by simulating the drilling of a well at a high level. As a component of generating the AFE, drilling and tripping schedules may be generated, as may a rough time vs. depth curve. The input to such a drilling simulator may be pore pressure curves, fracture gradient curves, a proposed trajectory, etc.

Figure 29:
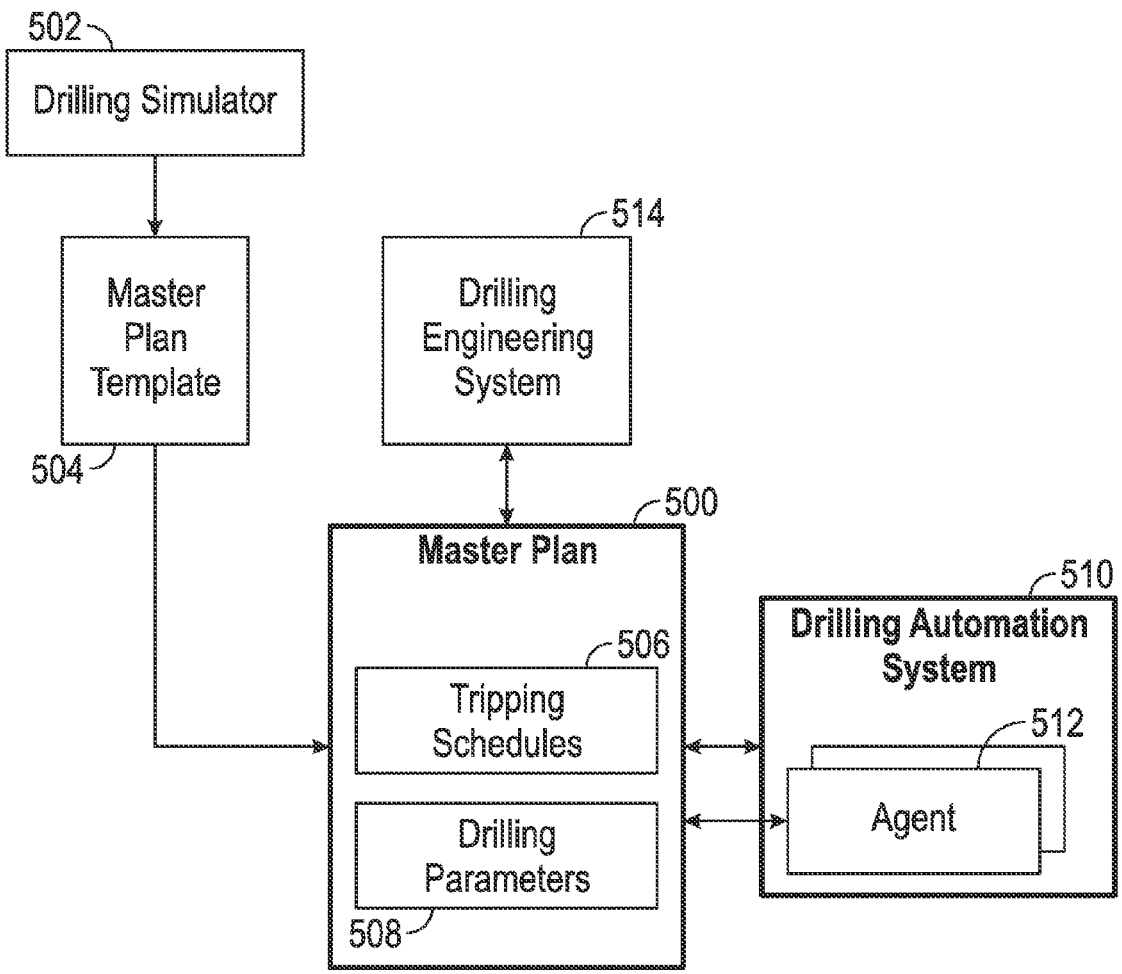
FIG. 29 is a block diagram illustrating the interaction of components in the system of FIG. 12 when interacting with a master plan.

As shown in FIG. 29, for drilling automation, a master plan 500 may incorporate the data generated by a drilling simulator to control how to drill a section or stand of drill pipe. Master plan 500, for example, may indicate tripping schedules 506 as well as additional drilling parameters 508, e.g., parameters for run in hole (RIH) and pulling out of hole (POOH) velocities, BHA descriptions, planned trajectory, limits for equipment and operations, etc., and a drilling simulator 502 like Osprey Risk may generate a template 504 for a well that may allow a drilling engineer to fill in parameters required for drilling a well using drilling automation. These static parameters may then be fed into a drilling automation system 510 to allow both system 510 and any agent 512 to query for parameters it cares about at appropriate times in the drilling automation process. A drilling engineer, e.g., through a drilling engineering system 514, may also be permitted to access and modify the master plan. Additionally, any phase based drilling automation adaptive workflow may look up at the plan at particular times in the operation where a choice is needed to determine what the next appropriate action is. For example, after completing drilling a stand, the option may be to begin POOH, reaming, wiping, starting a connection, or circulating. The master plan may generate these choices to allow the drilling automation system to proceed to the appropriate next step.

For other agents that are performing validations, actions, limits, alarms, monitoring, or triggers, the master plan may be able (by depth or time) to indicate the value of variables such as RPMs, FlowRates, and limits that should be used. In some embodiments, a master plan may be implemented as a resource that may be queried to obtain requested data. In other embodiments, the master plan may be implemented as an agent and registered to respond to queries or to otherwise provide limits or other parameters required during drilling automation. In such embodiments, the master plan may receive requests for data, determine the appropriate correlated data for the request based upon a time and/or spatial parameter, and then return that correlated data for use in the automation system.

Figure 30:
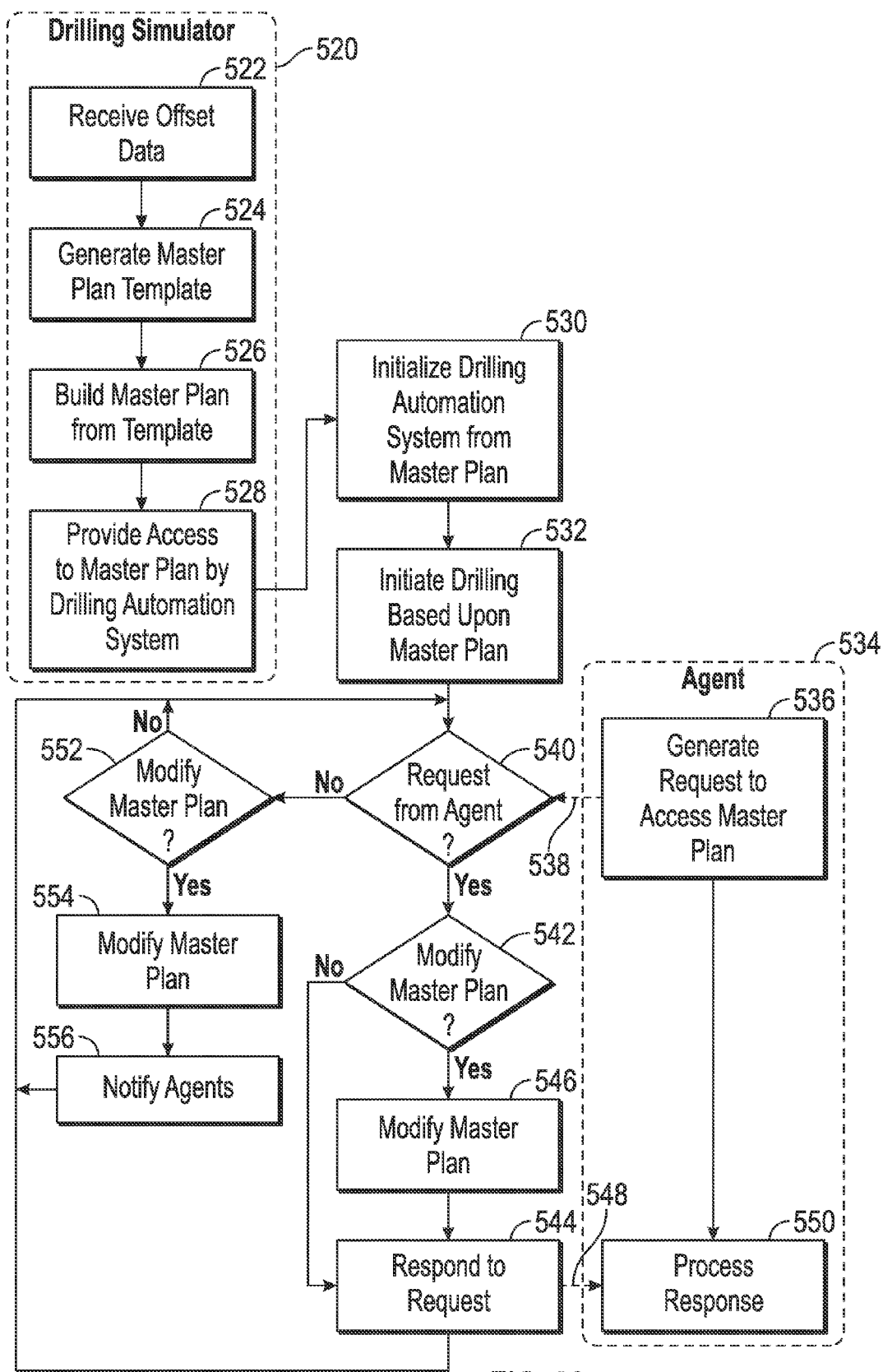
FIG. 30 is a flowchart illustrating an example sequence of operations for generating and accessing a master plan in the system of FIG. 12.

FIG. 30 illustrates an example sequence of operations that may be implemented to create and utilize a master plan in a drilling automation system. A drilling simulator 520, e.g., Osprey Risk, may receive offset data (block 522), e.g., PP, FG, t vs. depth curves, etc.), and generate therefrom a table of parameters, referred to as a "template," (block 524) that may be modified based upon local field knowledge to help drive the drilling process (block 526). After providing access to the master plan by the drilling automation system (block 528), the drilling automation system may be initialized from the master plan (block 530), and may be modified while drilling as more information is learned. Additionally, estimates of time remaining may be continually given as well as configurations to assist in service delivery (e.g. which real-time channels should be communicated to a client).

In block 532, the drilling automation system is initialized at a starting depth and time on the master plan, and follows the plan to initiate a drilling operation.

During the drilling operation, the master plan is accessed, and optionally modified, e.g., by an agent 534 that in block 536 generates a request 538 to access the master plan. As illustrated at block 540, the request is received, and a determination is made as to whether the request attempts to modify the master plan. If not, control passes to block 544 to respond to the request. Otherwise, the master plan is modified (if authorized and appropriate) in block 546. A response 548 is then returned to agent 534, which processes the response as illustrated in block 550.

In addition, during runtime of the drilling automation system, other requests to modify the master plan may be received, e.g., from a drilling engineering system or other workflow. Such requests are handled in block 552, which passes control to block 554 to modify the master plan. In addition, as illustrated in block 556, it may be necessary in some embodiments to notify agents of changes to the master plan in the event that the changes affect the runtime operation of a drilling process.

A wide variety of information may be stored in a master plan in various embodiments. In addition to those described above, for example, data such as formation information, trajectory information, equipment information, operations-related information, etc., may be included in a master plan. In addition, from the perspective of a tripping schedule, a master plan may specify how certain activities in a workflow should occur, e.g., after drill-off, whether to ream, wipe or simply end, whether to modify trajectory, etc. In addition, in one embodiment, for example, a master plan may be configured to correlate data based upon a measurement, e.g., to modify a speed of a top drive from a setpoint to reduce a resonant vibration component in response to a vibration detection during a drilling process. In such an embodiment, a measurement of a particular vibration level may cause the master plan to return the modified top drive setpoint.

Additional Phases and Agents

It will be appreciated that the flexibility afforded by the aforementioned dynamic phase machine driven automation system and the autonomous agents implementing the same allows for an innumerable number and types of phases and implementing agents. For example, in some embodiments, automatic calibration may be performed, e.g., to zero WOB, prior to initiating a drilling process to improve accuracy and repeatability of the drilling process. It has been found, for example, that prior to drilling a section including tripping, drilling and reaming, it is usually desirable to calibrate parameters that are used in computations used later in the process.

A dynamic phase machine may include a calibration phase that automates the calibration process to ensure that calibrations are performed in a consistent manner to achieve accurate, repeatable, and reliable calibrations from real-time measurements taken in a process that, for example, minimizes noise in real-time signals, assures a drilling rig is in the correct mode for taking a calibration, and performs the correct set of actions to achieve the right calibration.

Zeroing WOB is one such activity that attempts to get the drill string free weight so that WOB may be estimated from the difference between the HKLD and the HKLD when bit not on bottom. This may be done after the connection of each stand of drill pipe, and an example of this process is to ensure the bit is off bottom and then rotate the drill string to remove any points that are in static friction and that may hang up on the formation. Other calibrations that may be automated include computing the curve of RPM vs. Torque off bottom to enable bit torque to be better estimated, calibrating off bottom differential pressure vs. flow rate, examining vibrational response on and off bottom to help understand the "no-go" areas of drilling parameter settings, i.e. RPM/WOB/Flow/Back Pressure space, torque, etc.

It will be appreciated that additional phases and implementing agents, not mentioned herein, may be used in other embodiments. Other modifications will be apparent to one of ordinary skill in the art having the benefit of the instant disclosure. Therefore, the invention lies in the claims hereinafter appended.

What is claimed is:

1. A method of accepting a survey performed by a downhole survey device in a drilling system during an oil & gas drilling process to assess whether a drilling operation is proceeding along an intended path, the method comprising:
   executing in a drilling automation system at least a portion of a dynamic phase machine that implements a control algorithm for the oil & gas drilling process and includes a plurality of phases;
   when the dynamic phase machine is in a first phase among the plurality of phases, and after the survey is performed by the downhole survey device, causing at least one agent assigned to the first phase to compare survey data received from the downhole survey device against an acceptance criteria; and
   selectively transitioning the dynamic phase machine from the first phase to a second phase to proceed with the oil & gas drilling process based upon the comparison of the survey data against the acceptance criteria.

2. The method of claim 1, further comprising causing at least one agent registered with the drilling automation system to initiate the survey.

3. The method of claim 2, further comprising causing at least one agent registered with the drilling automation system to validate that the drilling system is in a condition to perform the survey prior to initiating the survey.

4. The method of claim 3, further comprising causing at least one agent registered with the drilling automation system to reconfigure the drilling system in a valid survey state in response to a failure to validate that the drilling system is in a condition to perform the survey.

5. The method of claim 2, wherein causing the at least one agent to initiate the survey includes controlling the drilling system to circulate drilling fluid while holding a drill string steady and thereby cause the downhole survey device to take the survey and transmit the survey data uphole.

6. The method of claim 1, wherein comparing the survey data against the acceptance criteria includes determining whether the survey data is corrupted by interference from a magnetic source, signal noise or a lack of signal strength.

7. The method of claim 1, wherein comparing the survey data against the acceptance criteria includes determining whether the survey data meets a quality threshold.

8. The method of claim 1, wherein selectively transitioning the dynamic phase machine from the first phase to the second phase to proceed with the oil & gas drilling process is performed automatically and without operator authorization.

9. The method of claim 1, further comprising, prior to selectively transitioning the dynamic phase machine from the first phase to the second phase, receiving operator authorization to accept the survey.

10. The method of claim 9, further comprising providing survey data for use by an operator prior to receiving operator authorization to accept the survey.

11. The method of claim 1, further comprising causing at least one agent registered with the drilling automation system to control the drilling system to retake the survey based upon the comparison of the survey data against the acceptance criteria.

12. The method of claim 1, further comprising causing at least one agent registered with the drilling automation system to change a drilling trajectory based upon the comparison of the survey data against the acceptance criteria.

13. An apparatus, comprising:
at least one processor; and
program code configured upon execution by the at least one processor to accept a survey performed by a downhole survey device in a drilling system during an oil & gas drilling process to assess whether a drilling operation is proceeding along an intended path, wherein the program code is configured to:
execute at least a portion of a dynamic phase machine that implements a control algorithm for the oil & gas drilling process and includes a plurality of phases;
when the dynamic phase machine is in a first phase among the plurality of phases, and after the survey is performed by the downhole survey device, cause at least one agent assigned to the first phase to compare survey data received from the downhole survey device against an acceptance criteria; and
selectively transition the dynamic phase machine from the first phase to a second phase to proceed with the oil & gas drilling process based upon the comparison of the survey data against the acceptance criteria.

14. The apparatus of claim 13, wherein the program code is further configured to cause at least one agent registered with the drilling automation system to initiate the survey.

15. The apparatus of claim 14, wherein the program code is further configured to cause at least one agent registered within the drilling automation system to validate that the drilling system is in a condition to perform the survey prior to initiating the survey, and to cause at least one agent registered with the drilling automation system to reconfigure the drilling system in a valid survey state in response to a failure to validate that the drilling system is in a condition to perform the survey.

16. The apparatus of claim 13, wherein the program code is configured to selectively transition the dynamic phase machine from the first phase to the second phase to proceed with the oil & gas drilling process automatically and without operator authorization.

17. The apparatus of claim 13, wherein the program code is configured to, prior to selectively transitioning the dynamic phase machine from the first phase to the second phase, receive operator authorization to accept the survey, and to provide survey data for use by an operator prior to receiving operator authorization to accept the survey.

18. The apparatus of claim 13, wherein the program code is configured to cause at least one agent registered with the drilling automation system to control the drilling system to retake the survey based upon the comparison of the survey data against the acceptance criteria.

19. The apparatus of claim 13, wherein the program code is configured to cause at least one agent registered with the drilling automation system to change a drilling trajectory based upon the comparison of the survey data against the acceptance criteria.

20. A program product, comprising:
a computer readable medium; and
program code resident on the computer readable medium and configured upon execution to accept a survey performed by a downhole survey device in a drilling system during an oil & gas drilling process to assess whether a drilling operation is proceeding along an intended path, wherein the program code is configured to:
execute at least a portion of a dynamic phase machine that implements a control algorithm for the oil & gas drilling process and includes a plurality of phases;
when the dynamic phase machine is in a first phase among the plurality of phases, and after the survey is performed by the downhole survey device, cause at least one agent assigned to the first phase to compare survey data received from the downhole survey device against an acceptance criteria; and
selectively transition the dynamic phase machine from the first phase to a second phase to proceed with the oil & gas drilling process based upon the comparison of the survey data against the acceptance criteria.

* * * * *